(12) United States Patent
Leger et al.

(10) Patent No.: US 11,060,943 B1
(45) Date of Patent: Jul. 13, 2021

(54) POLY WELDED ANNULUS TEST HEAD SYSTEMS AND METHODS

(71) Applicant: Trinity Bay Equipment Holdings, LLC, Houston, TX (US)

(72) Inventors: John Paul Leger, Baytown, TX (US); Ashesh Srivastava, Houston, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 0 days.

(21) Appl. No.: 17/077,039

(22) Filed: Oct. 22, 2020

(51) Int. Cl.
| | |
|---|---|
| *G01M 3/28* | (2006.01) |
| *E21B 47/00* | (2012.01) |
| *F16L 3/04* | (2006.01) |
| *G01M 3/02* | (2006.01) |

(52) U.S. Cl.
CPC .......... *G01M 3/2807* (2013.01); *E21B 47/00* (2013.01); *F16L 3/04* (2013.01); *G01M 3/022* (2013.01)

(58) Field of Classification Search
CPC ..... F16L 3/04; F16L 1/06; F16L 21/03; F16L 1/201; F16L 33/2076; F16L 55/134; F16L 13/143; F16L 1/09; F16L 33/18; F16L 33/207; F16L 39/005; F16L 13/142; F16L 13/146; F16L 13/165; F16L 1/028; F16L 1/11; F16L 2101/30; F16L 2201/30; F16L 2201/60; F16L 33/02; F16L 33/16; F16L 33/23; F16L 33/30; F16L 37/091; F16L 47/03; F16L 55/165; F16L 55/1652; F16L 55/40; F16L 59/143; F16L 59/18; G01M 3/022; G01M 3/28; G01M 3/2815; G01M 3/2869
See application file for complete search history.

(56) References Cited

U.S. PATENT DOCUMENTS

| | | | | | |
|---|---|---|---|---|---|
| 4,132,111 | A | * | 1/1979 | Hasha ................. | G01M 3/2861 277/320 |
| 4,644,780 | A | * | 2/1987 | Jeter ..................... | F16L 55/005 138/104 |
| 5,072,622 | A | * | 12/1991 | Roach ................... | G01M 3/283 73/40.5 R |
| 5,156,190 | A | * | 10/1992 | Staley, Jr. ............. | F16L 9/18 137/312 |
| 5,343,738 | A | * | 9/1994 | Skaggs ................. | F16L 11/121 138/113 |
| 6,179,523 | B1 | * | 1/2001 | Langner ................ | F16L 53/37 405/169 |

(Continued)

*Primary Examiner* — Nimeshkumar D Patel
*Assistant Examiner* — Gedeon M Kidanu
(74) *Attorney, Agent, or Firm* — Conrad J. Hsu

(57) ABSTRACT

Techniques implementing and/or operating a system includes a pipe segment and a test head assembly secured to the pipe segment. The pipe segment includes tubing that defines a pipe bore through the pipe segment and a fluid conduit in a tubing annulus of the pipe segment. The test head assembly includes barrier material poly welded to the tubing of the pipe segment to facilitate sealing the fluid conduit defined in the tubing annulus from environmental conditions external to the tubing of the pipe segment and a fluid port fluidly connected to the fluid conduit defined within the tubing annulus to enable integrity of the tubing to be tested at least in part by flowing a test fluid into the fluid conduit defined in the tubing annulus via the fluid port, extracting fluid from the fluid conduit defined in the tubing annulus via the fluid port, or both.

11 Claims, 7 Drawing Sheets

(56) References Cited

U.S. PATENT DOCUMENTS

| | | | |
|---|---|---|---|
| 8,909,479 B2 * | 12/2014 | Kvernvold | E21B 47/117 702/12 |
| 2010/0068986 A1 * | 3/2010 | Eccleston | G01M 3/283 454/339 |
| 2011/0229271 A1 * | 9/2011 | Clements | E21B 43/01 405/224.2 |
| 2013/0160886 A1 * | 6/2013 | Wright, Jr. | F16L 39/005 138/97 |
| 2016/0160635 A1 * | 6/2016 | Langseth | G01M 3/283 73/40.5 R |
| 2018/0231168 A1 * | 8/2018 | Barnes | F16L 55/165 |

\* cited by examiner

US 11,060,943 B1

POLY WELDED ANNULUS TEST HEAD SYSTEMS AND METHODS

BACKGROUND

The present disclosure generally relates to pipeline systems and, more particularly, to a test head assembly that may be deployed at a pipe segment, which is deployed or is to be deployed in a pipeline system, to facilitate determining an integrity state of the pipe segment.

Pipeline systems are often used to transport (e.g., convey) fluid, such as liquid and/or gas, from a fluid source to a fluid destination. For example, a pipeline system may be used to transport one or more hydrocarbons, such as crude oil, petroleum, natural gas, or any combination thereof. Additionally or alternatively, a pipeline system may be used to transport one or more other types of fluid, such as produced water, potable water, fresh water, fracturing fluid, flowback fluid, carbon dioxide, or any combination thereof.

To facilitate transporting fluid, a pipeline system may include one or more pipe segments in addition to pipe (e.g., midline and/or end) fittings, which are used to connect a pipe segment to another pipeline component, such as another pipe fitting, another pipe segment, a fluid source, and/or a fluid destination. Generally, a pipe segment includes tubing, which defines (e.g., encloses) a pipe bore that provides a primary fluid conveyance (e.g., flow) path through the pipe segment. More specifically, the tubing of a pipe segment may be implemented to facilitate isolating (e.g., insulating) fluid being conveyed within its pipe bore from environmental conditions external to the pipe segment, for example, to reduce the likelihood of the conveyed (e.g., bore) fluid being lost to the external environmental conditions and/or the external environmental conditions contaminating the conveyed fluid (e.g., clean and/or potable water).

However, at least in some instances, the presence of one or more faults, such as a breach, a kink, and/or a dent, in the tubing of a pipe segment may affect (e.g., reduce and/or compromise) its integrity and, thus, its ability to provide isolation (e.g., insulation). In other words, at least in some instances, operating a pipeline system while a pipe segment deployed therein has an integrity compromising fault may affect (e.g., reduce) operational efficiency and/or operational reliability of the pipeline system, for example, due to the fault resulting in conveyed fluid being lost to and/or contaminated by external environmental conditions. As such, to facilitate improving pipeline operational efficiency and/or operational reliability, the integrity of one or more pipe segments deployed or to be deployed in a pipeline system may be tested, for example, before beginning and/or resuming normal operation of the pipeline system.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a system includes a pipe segment and a test head assembly secured to the pipe segment. The pipe segment includes tubing that defines a pipe bore through the pipe segment and a fluid conduit in a tubing annulus of the pipe segment. The test head assembly includes barrier material poly welded to the tubing of the pipe segment to facilitate sealing the fluid conduit defined in the tubing annulus of the pipe segment from environmental conditions external to the tubing of the pipe segment and a fluid port fluidly connected to the fluid conduit defined within the tubing annulus of the pipe segment to enable integrity of the tubing to be tested at least in part by flowing a test fluid into the fluid conduit defined in the tubing annulus of the pipe segment via the fluid port, extracting fluid from the fluid conduit defined in the tubing annulus of the pipe segment via the fluid port, or both.

In another embodiment, a method of deploying a test head assembly at a pipe segment to facilitate determining integrity of the pipe segment, including poly welding barrier material of an inner barrier layer of the pipe segment, an outer barrier layer of the pipe segment, or both to facilitate sealing an open end of free space defined within a tubing annulus of the pipe segment from environmental conditions external to tubing of the pipe segment; and fluidly connecting a fluid port to the free space defined within the tubing annulus of the pipe segment to enable integrity of the pipe segment to be tested at least in part by flowing a test fluid into the free space defined in the tubing annulus of the pipe segment via the fluid port, extracting fluid from the free space defined in the tubing annulus of the pipe segment via the fluid port, or both.

In another embodiment, a test head assembly includes poly welded barrier material implemented at least in part by poly welding an inner barrier layer of a pipe segment and an outer barrier layer of the pipe segment, in which the poly welded barrier material facilitates sealing an open end of free space defined within a tubing annulus of the pipe segment, and a fluid port to be fluidly connected to an opening that is formed through the outer barrier layer of the pipe segment to the free space defined within the tubing annulus of the pipe segment to enable integrity of the pipe segment to be tested at least in part by flowing a test fluid into the free space defined within the tubing annulus of the pipe segment via the fluid port, extracting fluid from the free space defined within the tubing annulus of the pipe segment via the fluid port, or both.

DETAILED DESCRIPTION

Figure 1:
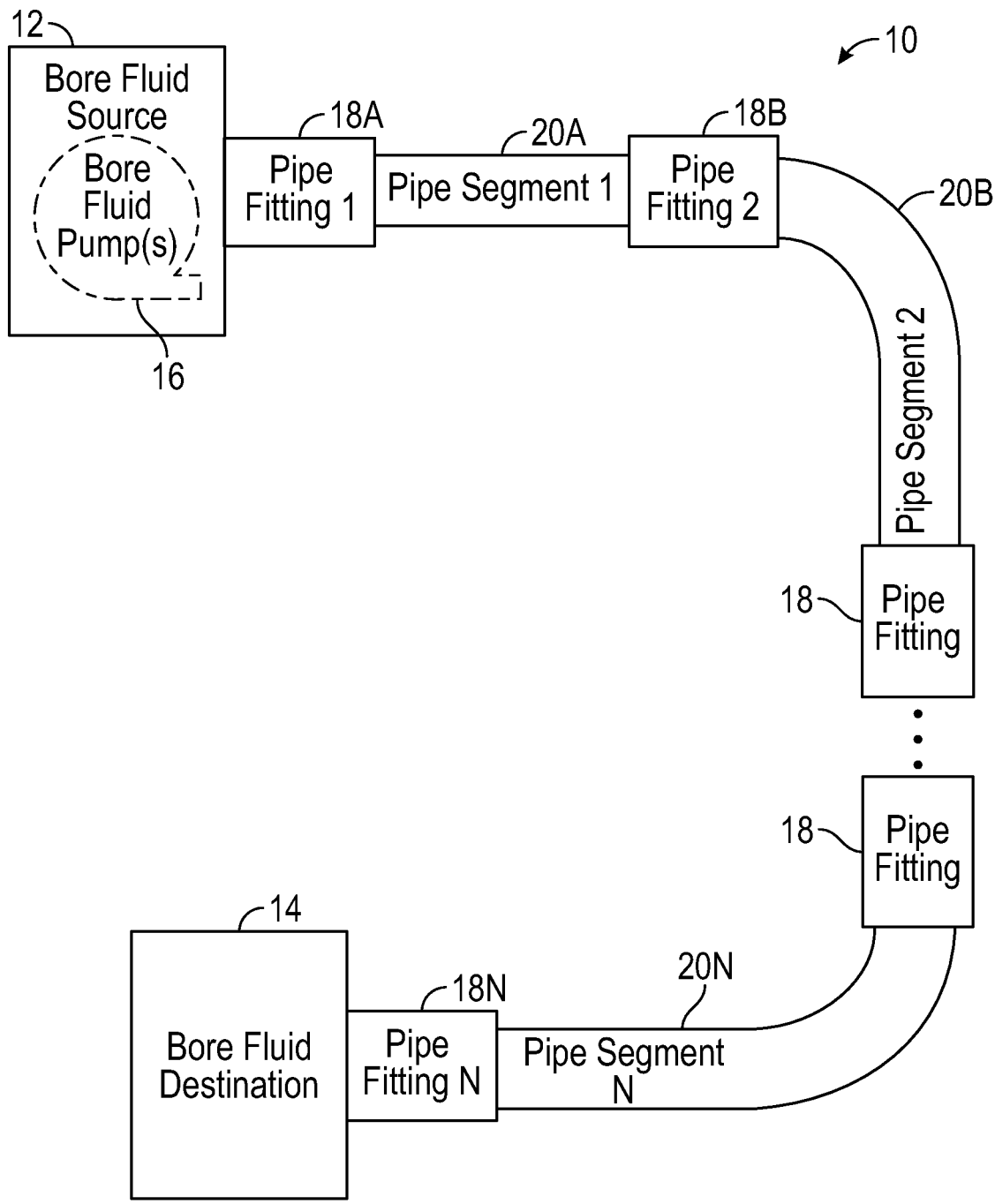
FIG. 1 is a block diagram of an example of a pipeline system including pipe segments and pipe fittings, in accordance with an embodiment of the present disclosure.

One or more specific embodiments of the present disclosure will be described below with reference to the figures. As used herein, the term "coupled" or "coupled to" may indicate establishing either a direct or indirect connection and, thus, is not limited to either unless expressly referenced as such. The term "set" may refer to one or more items. Wherever possible, like or identical reference numerals are used in the figures to identify common or the same features. The figures are not necessarily to scale. In particular, certain features and/or certain views of the figures may be shown exaggerated in scale for purposes of clarification.

The present disclosure generally relates to pipeline systems that may be implemented and/or operated to transport (e.g., convey) fluid, such as liquid and/or gas, from a fluid source to a fluid destination. Generally, a pipeline system may include pipe fittings, such as a midline pipe fitting and/or a pipe end fitting, and one or more pipe segments. More specifically, a pipe segment may generally be secured and sealed in one or more pipe fittings to facilitate fluidly coupling the pipe segment to another pipeline component, such as another pipe segment, another pipe fitting, a fluid source, and/or a fluid destination. Merely as an illustrative non-limiting example, a pipeline system may include a first pipe end fitting secured to a first pipe segment to facilitate fluidly coupling the first pipe segment to the fluid source, a midline pipe fitting secured between the first pipe segment and a second pipe segment to facilitate fluidly coupling the first pipe segment to the second pipe segment, and a second pipe end fitting secured to the second pipe segment to facilitate fluidly coupling the second pipe segment to the fluid destination.

In any case, a pipe segment generally includes tubing that defines (e.g., encloses) a pipe bore, which provides a primary fluid conveyance (e.g., flow) path through the pipe segment. More specifically, the tubing of a pipe segment may be implemented to facilitate isolating environmental conditions external to the pipe segment from conditions within its pipe bore and, thus, fluid that flows therethrough. In particular, the tubing of a pipe segment may primarily be implemented to block fluid flow directly between the pipe bore of the pipe segment and its external environmental conditions, for example, in addition to providing thermal, pressure, and/or electrical isolation (e.g., insulation).

To facilitate providing fluid isolation, in some instances, the tubing of a pipe segment may be implemented with multiple layers. For example, the tubing of a pipe segment may include an inner barrier (e.g., liner) layer and an outer barrier (e.g., shield or sheath) layer that each run (e.g., span) the length of the pipe segment. To facilitate blocking fluid flow directly therethrough, the inner barrier layer and the outer barrier layer may each be a continuous layer of solid material, such as plastic and/or a composite material, that runs the length of the pipe segment—although, at least in some instances, fluid from the pipe bore may nevertheless gradually permeate through the inner barrier layer and/or fluid from external environmental conditions may nevertheless gradually permeate through the outer barrier layer.

In some instances, the tubing of a pipe segment may additionally include one or more intermediate layers implemented between its inner barrier layer and its outer barrier layer and, thus, in a tubing annulus of the pipe segment, for example, to facilitate improving tensile strength and/or hoop strength of the pipe segment tubing. Additionally, to facilitate improving deployment (e.g., installation) efficiency, in some instances, an intermediate layer of pipe segment tubing may include solid material, such as metal and/or a composite material, as well as free space (e.g., one or more gaps) devoid of solid material. For example, an intermediate layer may include solid material helically wrapped (e.g., wound) on an inner (e.g., inner barrier and/or another intermediate) layer of the pipe segment tubing such that free space is left between adjacent solid strip wraps (e.g., windings). An outer (e.g., outer barrier and/or another intermediate) layer may then be implemented over the intermediate layer to cover the free space.

In other words, in such instances, the tubing annulus of a pipe segment tubing may include free space (e.g., one or more gaps) in which solid material is not implemented. Due to the reduced amount of solid material, at least in some instances, implementing an intermediate layer of pipe segment tubing to include free space may facilitate improving flexibility of the tubing of the pipe segment, for example, to facilitate reducing its minimum bend radius (MBR). In fact, at least in some instances, a flexible pipe segment may be spooled (e.g., on a reel and/or in a coil) and, thus, increasing its flexibility may facilitate improving deployment efficiency, for example, by enabling the pipe segment to be transported and/or deployed using a tighter spool.

Nevertheless, in some instances, a fault, such as a breach, a kink, and/or a dent, on pipe segment tubing may affect (e.g., compromise and/or reduce) its integrity and, thus, its ability to provide isolation (e.g., insulation) between the pipe bore of a corresponding pipe segment and environmental conditions external to the pipe segment. For example, a fault in the tubing of a pipe segment may result in excessive (e.g., undesired) fluid flow from the pipe segment directly out into environmental conditions external to the pipe segment and/or from the external environmental conditions directly into the pipe segment. In other words, at least in some instances, operating a pipeline system while pipe segment tubing deployed therein has an integrity compromising fault may affect (e.g., reduce) operational efficiency and/or operational reliability of the pipeline system, for example, due to the fault resulting in conveyed fluid being lost to and/or contaminated by external environmental conditions.

As such, to facilitate improving operational efficiency and/or operational reliability of a pipeline system, the integrity of one or more pipe segments deployed or to be deployed in the pipeline system may be tested, for example, via a testing process performed by a testing system before beginning and/or resuming normal operation of the pipeline system. In fact, to facilitate testing its integrity, in some instances, free space within the tubing annulus of a pipe segment may be defined such that it runs the length of the pipe segment, thereby providing one or more fluid conduits through which fluid can flow within the tubing of the pipe segment. As such, the outer barrier layer of the pipe segment may facilitate isolating conditions within the free space defined in the tubing annulus of the pipe segment from environmental conditions external to the pipe segment while the inner barrier layer of the pipe segment may facilitate isolating the conditions within the tubing annulus from conditions within the pipe bore of the pipe segment. In other words, in such instances, the pipe segment may be implemented to enable fluid flow in its pipe bore as well as fluid flow in the annulus of its tubing.

Leveraging this fact, in some instances, a testing process and/or a testing system may test integrity of a pipe segment at least in part by injecting (e.g., supplying and/or pumping) test fluid into free space (e.g., one or more fluid conduits) defined with the tubing annulus of a pipe segment and determining one or more fluid parameters that result downstream due to the test fluid injection, for example, via one or more test fluid sources (e.g., pumps and/or compressed air tanks) and one or more fluid parameter sensors, respectively. Merely as an illustrative non-limiting example, the one or more downstream fluid parameters may include a downstream fluid temperature determined (e.g., measured and/or sensed) by a temperature sensor. Additionally or alternatively, the one or more downstream fluid parameters may include a downstream fluid pressure determined by a pressure sensor, a downstream fluid composition (e.g., constituent percentages) determined by a fluid composition sensor, or both.

Furthermore, in some instances, the test fluid used by a testing process and/or a testing system may be an inert fluid, such as nitrogen (e.g., $N_2$) gas, for example, to facilitate reducing the likelihood that the test fluid itself affects (e.g., compromises and/or corrodes) the integrity of a pipe segment being tested. Moreover, in some instances, one or more fluid parameters of the test fluid may be pre-determined, for example, offline by a test lab and/or a fluid supplier. Additionally or alternatively, one or more fluid parameters of the test fluid may be determined while the test fluid is being supplied to the tubing annulus of a pipe segment, for example, online and/or in real-time via one or more fluid parameter sensors.

In other words, a fluid parameter of the test fluid may be an upstream fluid parameter and, thus, comparison with a corresponding downstream fluid parameter may indicate the change in the fluid parameter that results from fluid flow through free space defined within the tubing annulus of a pipe segment. As described above, the tubing of a pipe segment may generally be implemented to provide isolation, such as thermal isolation (e.g., insulation), fluid flow isolation, and/or pressure isolation, and, thus, to facilitate reducing the amount fluid parameters change due to fluid flow therein. Although some amount of change in a fluid parameter may nevertheless occur, the change may generally be predictable, for example, based at least in part on a model, empirical testing, external environmental conditions, fluid parameters of the injected test fluid, implementation parameters, such as material and/or thickness, of the pipe segment tubing, or any combination thereof.

In other words, at least in some instances, an unexpected change in downstream fluid parameters may indicate that the integrity of a pipe segment is compromised by one or more faults, such as a dent, a kink, and/or a breach. For example, an unexpected change (e.g., drop) in downstream fluid pressure relative to pressure of injected test fluid may be indicative of fluid leaking from the tubing annulus of the pipe segment and, thus, that the pipe segment is potentially faulty. Additionally, an unexpected change (e.g., increase or decrease) in downstream fluid temperature relative to temperature of injected test fluid may be indicative of increased heat transfer between fluid in the tubing annulus of the pipe segment and conditions external to the tubing of the pipe segment and, thus, that the pipe segment tubing is potentially faulty and/or that the external (e.g., environmental and/or bore) conditions will potentially shorten the lifespan of the pipe segment tubing. Furthermore, an unexpected change in downstream fluid composition relative to composition of injected test fluid may be indicative of conditions external to the tubing of the pipe segment contaminating fluid in the tubing annulus of the pipe segment and, thus, that the pipe segment tubing is potentially faulty. In other words, efficacy (e.g., accuracy) of an integrity test for a pipe segment may be premised on free space (e.g., gaps and/or fluid conduits) defined in its tubing annulus being fluidly isolated from conditions external to the tubing of the pipe segment.

Accordingly, to facilitate testing pipe integrity, the present disclosure provides techniques for implementing and/or deploying a test head assembly of a testing system to facilitate sealing the free space within a tubing annulus of a pipe segment deployed or to be deployed in a pipeline system while enabling test fluid to flow into and/or out from the free space within the tubing annulus of the pipe segment. As will be described in more detail below, to enable fluid flow into and/or out from the tubing annulus of a pipe segment, a test head assembly may generally include one or more fluid ports, which are implemented to be fluidly connected to free space defined within the tubing annulus of the pipe segment. Additionally, to facilitate sealing the free space within the tubing annulus of a pipe segment, a test head assembly may generally include barrier material poly (e.g., plastic) welded to the inner barrier layer and/or the outer barrier layer of the pipe segment such that the poly welded barrier material covers (e.g., encloses) an open end of the tubing annulus of the pipe segment.

In particular, in some embodiments, poly welded barrier material of a test head assembly may be implemented at least in part by poly welding (e.g., friction welding) a ring of supplemental barrier material to an end of the tubing of a pipe segment. To facilitate properly aligning a barrier material ring with the tubing of a pipe segment, at least in some such embodiments, a test head assembly may additionally include a coned bore plug, which is implemented to be inserted into an open end of the pipe bore of the pipe segment. In particular, at least in some instances, the coned bore plug may be implemented such that its ending outer surface diameter is greater than an inner surface diameter of the tubing of the pipe segment, for example, due to ovalization of the pipe segment tubing. Thus, at least in such instances, inserting the coned bore plug into the pipe bore of the pipe segment may facilitate circularizing the tubing of the pipe segment. In fact, in some embodiments, a coned bore plug in a test head assembly may be integrated with a corresponding barrier material ring, for example, such that the barrier material ring is implemented circumferentially around the coned bore plug. However, in other embodiments, a coned bore plug and a corresponding barrier material ring in a test head assembly may be implemented as separate (e.g., discrete) components and, thus, the coned bore plug may be inserted into the pipe bore of a pipe segment before the barrier material ring is poly welded to the tubing of the pipe segment.

In any case, in some embodiments, poly welded barrier material of a test head assembly may generally match the barrier material used to implement the inner barrier layer and/or the outer barrier layer of a pipe segment at which the test head assembly is to be deployed. For example, the poly welded barrier material may be high-density polyethylene (HDPE) or another suitable type of plastic. In fact, in some embodiments, poly welded barrier material of a test head assembly may include barrier material from the inner barrier layer and/or the outer barrier layer of a pipe segment at which the test head assembly is deployed, for example, without the addition of supplemental barrier (e.g., filler) material.

To facilitate poly welding the inner barrier layer of a pipe segment to the outer barrier layer of the pipe segment, in some embodiments, the one or more intermediate layers included in the tubing annulus of the pipe segment and the outer barrier layer of the pipe segment may be cutback relative to the inner barrier layer, for example, in a tiered (e.g., wedding cake) manner. Merely as an illustrative non-limiting example, the one or more intermediate layers included in the tubing annulus may each be cutback relative to the inner barrier layer a shorter (e.g., first) distance while the outer barrier layer may be cutback relative to the inner barrier layer a longer (e.g., second) distance, for example, to facilitate providing more barrier material for poly welding. Accordingly, in such embodiments, poly welded barrier material may be implemented at least in part by bending (e.g., flaring) barrier material of the inner barrier layer out over the one or more intermediate layers and poly welding the barrier material of the inner barrier layer to the barrier material of the outer barrier layer.

In any case, as mentioned above, a test head assembly in a testing system may include one or more fluid ports in addition to poly welded barrier material. In particular, in some embodiments, a fluid port of a test head assembly may be fluidly connected to free space defined within the tubing annulus of a pipe segment via a fluid tube embedded within poly welded barrier material of the test head assembly. For example, in some such embodiments, the fluid tube may be embedded within a barrier material ring such that it extends through the barrier material ring and can be aligned with free space defined within the tubing annulus of a pipe segment to which the barrier material ring is to be secured. However, in other embodiments, the fluid tube may be connected to free space within the tubing annulus of a pipe segment before melted barrier material is subsequently disposed around the fluid tube.

Moreover, in other embodiments, a fluid port of a test head assembly may be implemented separate from poly welded barrier material of the test head assembly. In particular, in some such embodiments, the fluid port may be secured to an opening (e.g., hole) that is formed through the outer barrier layer of a pipe segment such that the opening is fluidly connected to free space defined within the tubing annulus of the pipe segment, for example, via a clamp that wraps circumferentially around the tubing of the pipe segment. In any case, in this manner, as will be described in more detail below, the present disclosure provides techniques for implementing and/or deploying a test head assembly to facilitate testing integrity of one or more pipe segments deployed or to be deployed in a pipeline system, which, at least in some instances, may facilitate improving operational efficiency and/or operational reliability of the pipeline system, for example, at least in part by enabling a fault in the pipeline system to be ameliorated (e.g., fixed and/or repaired) before the pipeline system begins and/or resumes normal operation.

To help illustrate, an example of a pipeline system 10 is shown in FIG. 1. As in the depicted example, the pipeline system 10 may be coupled between a bore fluid source 12 and a bore fluid destination 14. Merely as an illustrative non-limiting example, the bore fluid source 12 may be a production well and the bore fluid destination 14 may be a fluid storage tank. In other instances, the bore fluid source 12 may be a first (e.g., lease facility) storage tank and the bore fluid destination 14 may be a second (e.g., refinery) storage tank.

In any case, the pipeline system 10 may generally be implemented and/or operated to facilitate transporting (e.g., conveying) fluid, such as gas and/or liquid, from the bore fluid source 12 to the bore fluid destination 14. In fact, in some embodiments, the pipeline system 10 may be used in many applications, including without limitation, both onshore and offshore oil and gas applications. For example, in such embodiments, the pipeline system 10 may be used to transport one or more hydrocarbons, such as crude oil, petroleum, natural gas, or any combination thereof. Additionally or alternatively, the pipeline system 10 may be used to transport one or more other types of fluid, such as produced water, fresh water, fracturing fluid, flowback fluid, carbon dioxide, or any combination thereof.

To facilitate flowing fluid to the bore fluid destination 14, in some embodiments, the bore fluid source 12 may include one or more bore fluid pumps 16 that are implemented and/or operated to inject (e.g., pump and/or supply) fluid from the bore fluid source 12 into a bore of the pipeline system 10. However, it should be appreciated that the depicted example is merely intended to be illustrative and not limiting. In particular, in other embodiments, one or more bore fluid pumps 16 may not be implemented at the bore fluid source 12, for example, when fluid flow through the bore of the pipeline system 10 is produced by gravity. Additionally or alternatively, in other embodiments, one or more bore fluid pumps 16 may be implemented in the pipeline system 10 and/or at the bore fluid destination 14.

To facilitate transporting fluid from the bore fluid source 12 to the bore fluid destination 14, as in the depicted example, a pipeline system 10 may include one or more pipe fittings (e.g., connectors) 18 and one or more pipe segments 20. For example, the depicted pipeline system 10 includes a first pipe segment 20A, a second pipe segment 20B, and an Nth pipe segment 20N. Additionally, the depicted pipeline system 10 includes a first pipe (e.g., end) fitting 18A, which couples the bore fluid source 12 to the first pipe segment 20A, a second pipe (e.g., midline) fitting 18B, which couples the first pipe segment 20A to the second pipe segment 20B, and an Nth pipe (e.g., end) fitting 18N, which couples the Nth pipe segment 20N to the bore fluid destination 14.

However, it should again be appreciated that the depicted example is merely intended to be illustrative and not limiting. In particular, in other embodiments, a pipeline system 10 may include fewer than three (e.g., two or one) pipe segments 20 or more than three (e.g., four, five, or more) pipe segments 20. Additionally or alternatively, in other embodiments, a pipeline system 10 may include fewer than four (e.g., three or two) pipe fittings 18 or more than four (e.g., five, six, or more) pipe fittings 18.

In any case, as described above, a pipe segment 20 generally includes tubing that may be used to convey (e.g., transfer and/or transport) water, gas, oil, and/or any other suitable type of fluid. The tubing of a pipe segment 20 may be made of any suitable type of material, such as plastic, metal, and/or a composite (e.g., fiber-reinforced composite) material. In fact, as will be described in more detail below, in some embodiments, the tubing of a pipe segment 20 may be implemented using multiple different layers. For example, the tubing of a pipe segment 20 may include a first high-density polyethylene (e.g., internal corrosion protection) layer, one or more intermediate (e.g., steel strip) layers external to the first high-density polyethylene layer, and a second high-density polyethylene (e.g., external corrosion protection) layer external to the one or more intermediate layers.

Additionally, as in the depicted example, one or more (e.g., second and/or Nth) pipe segments 20 in a pipeline system 10 may be curved. To facilitate implementing a curve in a pipe segment 20, in some embodiments, the pipe segment 20 may be flexible, for example, such that the pipe segment 20 is spoolable on a reel and/or in a coil (e.g., during transport and/or before deployment of the pipe segment 20). In other words, in some embodiments, one or more pipe segments 20 in the pipeline system 10 may be a flexible pipe, such as a bonded flexible pipe, an unbonded flexible pipe, a flexible composite pipe (FCP), a thermoplastic composite pipe (TCP), or a reinforced thermoplastic pipe (RTP). In fact, at least in some instances, increasing flexibility of a pipe segment 20 may facilitate improving deployment efficiency of a pipeline system 10, for example, by obviating a curved (e.g., elbow) pipe fitting 18 and/or enabling the pipe segment 20 to be transported to the pipeline system 10, deployed in the pipeline system 10, or both using a tighter spool.

To facilitate improving pipe flexibility, in some embodiments, the tubing of a pipe segment 20 that defines (e.g., encloses) its pipe bore may additionally include free space (e.g., one or more gaps) devoid of solid material. In fact, in some embodiments, free space defined in the tubing of a pipe segment 20 may run (e.g., span) the length of the pipe segment 20 and, thus, define (e.g., enclose) a fluid conduit (e.g., free space) in the annulus of the tubing, which is separate from the pipe bore. In other words, in such embodiments, fluid may flow through a pipe segment 20 via its pipe bore, free space (e.g., gaps and/or one or more fluid conduits) defined within its tubing annulus, or both.

Figure 2:
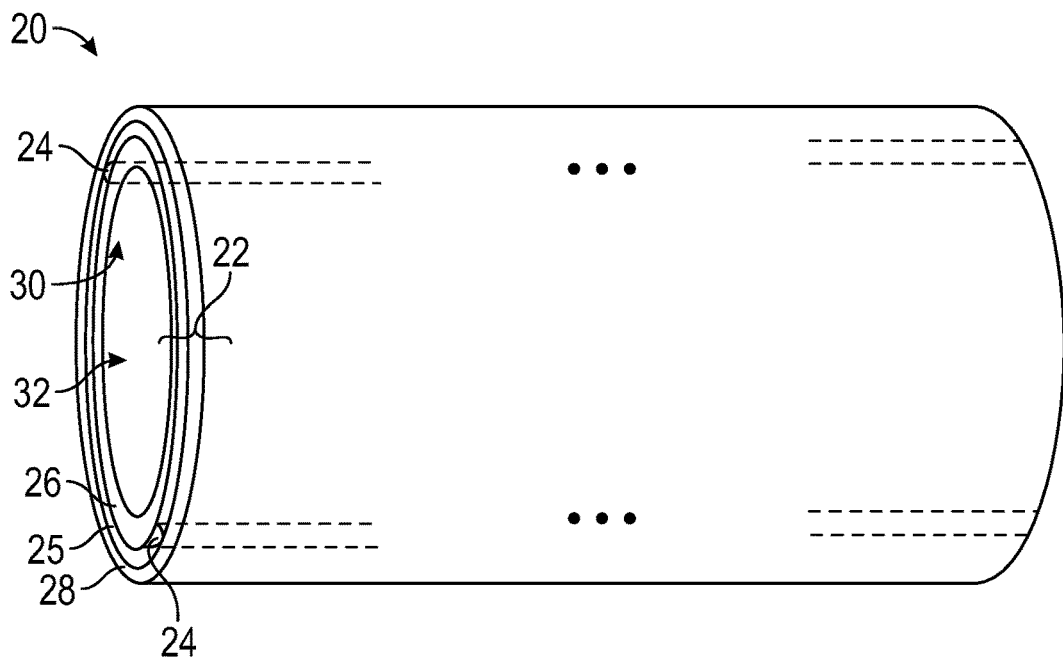
FIG. 2 is a side view of an example of a pipe segment of FIG. 1 that includes a pipe bore defined by its tubing as well as fluid conduits implemented within an annulus of its tubing, in accordance with an embodiment of the present disclosure.

To help illustrate, an example of a pipe segment 20, which includes tubing 22 with fluid conduits (e.g., free space) 24 defined in its annulus 25, is shown in FIG. 2. As depicted, the pipe segment tubing 22 is implemented with multiple layers including an inner barrier (e.g., liner) layer 26 and an outer barrier (e.g., shield and/or sheath) layer 28. In some embodiments, the inner barrier layer 26 and/or the outer barrier layer 28 of the pipe segment tubing 22 may be implemented using composite material and/or plastic, such as high-density polyethylene (HDPE) and/or raised temperature polyethylene (PE-RT). Although a number of particular layers are depicted, it should be understood that the techniques described in the present disclosure may be broadly applicable to composite pipe body structures including two or more layers, for example, as distinguished from a rubber or plastic single-layer hose subject to vulcanization. In any case, as depicted, an inner surface 30 of the inner barrier layer 26 defines (e.g., encloses) a pipe bore 32 through which fluid can flow, for example, to facilitate transporting fluid from a bore fluid source 12 to a bore fluid destination 14.

Additionally, as depicted, the annulus 25 of the pipe segment tubing 22 is implemented between its inner barrier layer 26 and its outer barrier layer 28. As will be described in more detail below, the tubing annulus 25 may include one or more intermediate layers of the pipe segment tubing 22. Furthermore, as depicted, fluid conduits (e.g., free space and/or gaps) 24 running along the length of the pipe segment 20 are defined (e.g., enclosed) in the tubing annulus 25. As described above, a fluid conduit 24 in the tubing annulus 25 may be devoid of solid material. As such, pipe segment tubing 22 that includes one or more fluid conduits 24 defined in its annulus 25 may include less solid material and, thus, exert less resistance to flexure, for example, compared to solid pipe segment tubing 22 and/or pipe segment tubing 22 that does not include fluid conduits 24 defined therein. Moreover, to facilitate further improving pipe flexibility, in some embodiments, one or more layers in the tubing 22 of a pipe segment 20 may be unbonded from one or more other layers in the tubing 22 and, thus, the pipe segment 20 may be an unbonded pipe.

However, it should be appreciated that the depicted example is merely intended to be illustrative and not limiting. In particular, in other embodiments, a pipe segment 20 may include fewer than two (e.g., one) or more that two (e.g., three, four, or more) fluid conduits 24 defined in its tubing annulus 25. Additionally or alternatively, in other embodiments, a fluid conduit 24 defined in the tubing annulus 25 of a pipe segment 20 may run non-parallel to the pipe bore 32 of the pipe segment 20, for example, such that the fluid conduit 24 is skewed relative to the longitudinal extent of the pipe bore 32 of the pipe segment 20.

Figure 3:
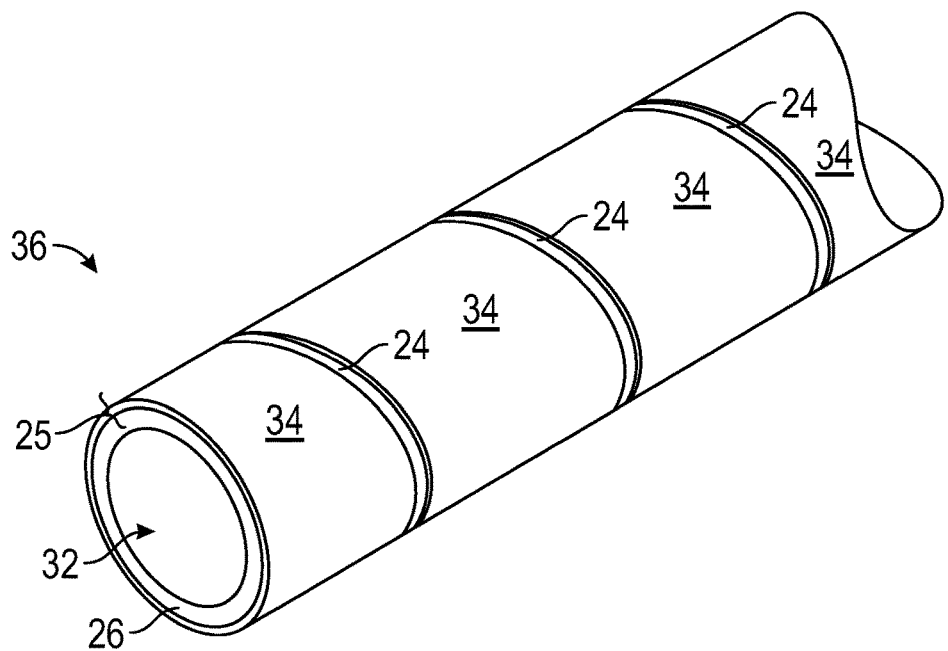
FIG. 3 is an example of a portion of the pipe segment of FIG. 2 with a helically shaped fluid conduit implemented within the annulus of its tubing, in accordance with an embodiment of the present disclosure.

To help illustrate, an example of a portion 36 of a pipe segment 20, which includes an inner barrier layer 26 and an intermediate layer 34 included in the annulus 25 of its pipe segment tubing 22, is shown in FIG. 3. In some embodiments, one or more intermediate layers 34 of the pipe segment tubing 22 may be implemented at least in part using composite material and/or metal, such as carbon steel, stainless steel, duplex stainless steel, super duplex stainless steel, or any combination thereof. In other words, at least in some such embodiments, the intermediate layer 34 of the pipe segment tubing 22 may be implemented using electrically conductive, which, at least in some instances, may enable communication of electrical (e.g., test and/or return) signals via the intermediate layer 34.

In any case, as depicted, the intermediate layer 34 is helically disposed (e.g., wound and/or wrapped) on the inner barrier layer 26 such that free space is left between adjacent windings to define a fluid conduit 24. In other words, in some embodiments, the intermediate layer 34 may be implemented at least in part by winding a metal (e.g., steel) strip around the inner barrier layer 26 at a non-zero lay angle (e.g., fifty-four degrees) relative to the longitudinal extent of the pipe bore 32. In any case, as depicted, the resulting fluid conduit 24 runs helically along the pipe segment 20, for example, such that the fluid conduit 24 is skewed fifty-four degrees relative to the longitudinal extent of the pipe bore 32.

In some embodiments, an outer barrier layer 28 may be disposed directly over the depicted intermediate layer 34 and, thus, cover and/or define (e.g., enclose) the depicted fluid conduit 24. However, in other embodiments, the tubing annulus 25 of a pipe segment 20 may include multiple (e.g., two, three, four, or more) intermediate layers 34. In other words, in such embodiments, one or more other intermediate layers 34 may be disposed over the depicted intermediate layer 34. In fact, in some such embodiments, the one or more other intermediate layers 34 may also each be helically disposed such that free space is left between adjacent windings to implement one or more corresponding fluid conduits 24 in the tubing annulus 25 of the pipe segment 20. For example, a first other intermediate layer 34 may be helically disposed on the depicted intermediate layer 34 using the same non-zero lay angle as the depicted intermediate layer 34 to cover (e.g., define and/or enclose) the depicted fluid conduit 24 and to implement another fluid conduit 24 in the first other intermediate layer 34. Additionally, a second other intermediate layer 34 may be helically disposed on the first other intermediate layer 34 using another non-zero lay angle, which is the inverse of the non-zero lay angle of the depicted intermediate layer 34, to implement another fluid conduit 24 in the second other intermediate layer 34. Furthermore, a third other intermediate layer 34 may be helically disposed on the second other intermediate layer 34 using the same non-zero lay angle as the second other intermediate layer 34 to cover the other fluid conduit 24 in the second other intermediate layer 34 and to implement another fluid conduit 24 in the third other intermediate layer 34. In some embodiments, an outer barrier layer 28 may be disposed over the third other intermediate layer 34 and, thus, cover (e.g., define and/or enclose) the other fluid conduit 24 in the third other intermediate layer 34.

In any case, as described above, the tubing 22 of a pipe segment 20 may generally be implemented to facilitate isolating conditions within the pipe bore 32 of the pipe segment 20 from environmental conditions external to the pipe segment 20. However, even when implemented with multiple layers, in some instances, a fault, such as a breach, a kink, and/or a dent, in the tubing 22 of a pipe segment 20 may compromise its integrity and, thus, its ability to provide isolation, for example, due to the fault resulting in excessive (e.g., undesired) fluid flow from the pipe segment 20 directly out into environmental conditions external to the pipe segment 20 and/or from the external environmental conditions directly into the pipe segment 20. As such, at least in some instances, operating a pipeline system 10 while the tubing 22 of a pipe segment 20 deployed therein has an integrity compromising fault may affect (e.g., reduce) operational efficiency and/or operational reliability of the pipeline system 10, for example, due to the fault resulting in conveyed fluid being lost to and/or contaminated by external environmental conditions. As such, to facilitate improving operational efficiency and/or operational reliability of a pipeline system 10, in some embodiments, the integrity of a pipe segment 20 deployed or to be deployed in the pipeline system 10 may be tested via a testing system, for example, which is implemented and/or operated to perform a integrity test on the pipe segment 20 before beginning and/or resuming normal operation of the pipeline system 10.

Figure 4:
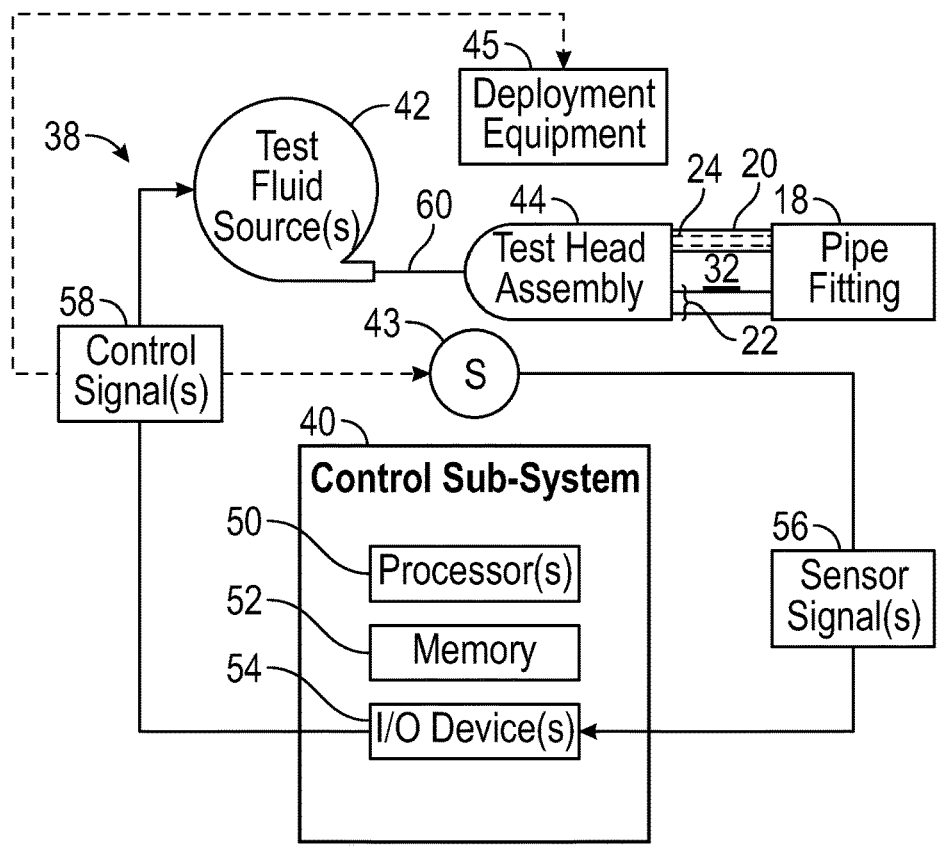
FIG. 4 is a block diagram of an example of a testing system that includes a test head assembly, in accordance with an embodiment of the present disclosure.

To help illustrate, an example of a testing system 38, which may be used to test the integrity of a pipe segment 20, is shown in FIG. 4. As in the depicted example, a testing system 38 may generally include a control sub-system 40, one or more test fluid sources 42, one or more fluid parameter sensors 43, and at least one test head assembly 44. In particular, as depicted, the test head assembly 44 is coupled to an (e.g., first) end of the pipe segment 20 being tested.

However, it should be appreciated that the depicted example is merely intended to be illustrative and not limiting. In particular, although a single pipe segment 20 is depicted, in other embodiments, multiple pipe segments 20 may be concurrently tested, for example, by fluidly coupling the pipe segments 20 between the test head assembly 44 and the depicted pipe fitting 18 via one or more midline pipe fittings 18. Additionally or alternatively, although a pipe fitting 18 is depicted as being coupled to another (e.g., second and/or opposite) end of the pipe segment 20 being tested, in other embodiments, another test head assembly 44 may be used instead. In other words, in such embodiments, a first test head assembly 44 may be coupled to a first end of a pipe segment 20 while a second test head assembly 44 is coupled to a second (e.g., opposite) end of the pipe segment 20.

In any case, as depicted, the testing system 38 additionally includes deployment equipment 45, which is implemented and/or operated to facilitate securing the test head assembly 44 to a pipe segment 20. In particular, as will be described in more detail below, in some embodiments, the deployment equipment 45 may include a poly welding (e.g., heating) device, which is implemented and/or operated to poly (e.g., plastic) weld the test head assembly 44 to the pipe segment. Additionally, in some embodiments, operation of the deployment equipment 45 may be controlled by the control sub-system 40, for example, based at least in part on one or more control signals 58 received from the control sub-system 40. However, in other embodiments, operation of the deployment equipment 45 may be manually controlled, for example, by an operator (e.g., user and/or service technician) of the testing system 38.

Additionally, in some embodiments, a test fluid source 42 in the testing system 38 may include a test fluid pump and/or a compressed air tank, which is implemented and/or operated to selectively supply (e.g., inject and/or pump) test fluid to the test head assembly 44 via one or more external fluid conduits (e.g., hoses) 60, for example, based at least in part on a control signal 58 received from the control sub-system 40 and/or valve position of one or more valves fluidly coupled between the test fluid source 42 and the test head assembly 44. Although testing examples that utilize test fluid injection are described, in other embodiments, the techniques described in the present disclosure may additionally or alternatively be utilized in testing processes and/or testing systems 38 that are based on test fluid extraction. In other words, in such embodiments, the test fluid source 42 in the testing system 38 may include a test fluid pump, which is implemented and/or operated to selectively extract (e.g., vacuum and/or pump) test fluid out from the test head assembly 44 via one or more external fluid conduits 60, for example, based at least in part on a control signal 58 received from the control sub-system 40 and/or valve position of one or more valves fluidly coupled between the test fluid source 42 and the test head assembly 44.

Thus, at least in some embodiments, the control sub-system 40 may generally control operation of the testing system 38. To facilitate controlling operation, as in the depicted example, a control sub-system 40 may generally include one or more processors 50, memory 52, and one or more input/output (I/O) devices 54. In particular, in some embodiments, the memory 52 in a control sub-system 40 may include one or more tangible, non-transitory, computer-readable media that are implemented and/or operated to store data and/or executable instructions. For example, the memory 52 may store sensor data based at least in part on one or more sensor signals 56 received from a fluid parameter sensor 43. As such, in some embodiments, the memory 52 may include volatile memory, such as random-access memory (RAM), and/or non-volatile memory, such as read-only memory (ROM), flash memory, a solid-state drive (SSD), a hard disk drive (HDD), or any combination thereof.

Additionally, in some embodiments, a processor 50 in a control sub-system 40 may include processing circuitry that is implemented and/or operated to process data and/or execute instructions stored in memory 52. In other words, in some such embodiments, a processor 50 in a control sub-system 40 may include one or more general purpose microprocessors, one or more application specific integrated circuits (ASICs), one or more field programmable gate arrays (FPGAs), or any combination thereof. For example, a processor 50 in a control sub-system 40 may process sensor data stored in memory 52 to determine an integrity state of a pipe segment 20 being tested.

Additionally or alternatively, a processor 50 in a control sub-system 40 may execute instructions stored in memory 52 to determine one or more control (e.g., command) signals 58 that instruct the testing system 38 to perform a corresponding control action. For example, the control sub-system 40 may determine a control signal 58 that instructs a test fluid source 42 to supply (e.g., inject and/or pump) test fluid to the test head assembly 44. As another example, the control sub-system 40 may determine a control signal 58 that instructs a fluid parameter sensor 43 to return one or more sensor signals 56 indicative of corresponding fluid parameters, such as fluid temperature, fluid pressure, and/or fluid composition, determined (e.g., sensed and/or measured) by the fluid parameter sensor 43.

To enable communication outside a control sub-system 40, in some embodiments, the I/O devices 54 of the control sub-system 40 may include one or more input/output (I/O) ports (e.g., terminals). Additionally, to facilitate communicating the results of an integrity test to a user (e.g., operator), in some embodiments, the I/O devices 54 of a control sub-system 40 may include one or more user output devices, such as an electronic display, which is implemented and/or operated to display a graphical user interface (GUI) that provides a visual representation of integrity test results (e.g., integrity state of tested pipe segment 20). Furthermore, to enable user interaction with the testing system 38, in some embodiments, the I/O devices 54 of a control sub-system 40 may include one or more user input devices, such as a hard button, a soft button, a keyboard, a mouse, and/or the like. For example, the one or more user input devices may enable an operator to input a user command that instructs the testing system 38 to initiate an integrity test for a pipe segment 20.

In any case, as described above, the tubing 22 of a pipe segment 20 is generally implemented to facilitate isolating (e.g., insulating) conditions internal to the pipe segment 20 from environmental conditions external to the pipe segment 20. For example, an outer barrier layer 28 of a pipe segment may be implemented to facilitate isolating the external environmental conditions from conditions in the pipe bore 32 of the pipe segment 20 and, thus, from conditions in free space (e.g., one or more a fluid conduits 24) defined within the tubing annulus 25 of the pipe segment 20, which is internal to the outer barrier layer 28 of the pipe segment 20. Additionally or alternatively, an inner barrier layer 26 of a pipe segment 20 may be implemented to facilitate isolating the conditions in the pipe bore 32 of the pipe segment 20 from the external environmental condition and, thus, from the conditions in free space defined within the tubing annulus 25 of the pipe segment 20, which is external to the inner barrier layer 26 of the pipe segment tubing 22.

Nevertheless, in some instances, a fault, such as a dent, a kink, and/or a breach, in the tubing 22 of a pipe segment 20 may affect (e.g., compromise and/or reduce) its integrity and, thus, its ability to provide isolation. For example, a fault in the outer barrier layer 28 of a pipe segment 20 may reduce its ability to provide isolation between environmental conditions external to the pipe segment 20 and the conditions in free space (e.g., one or more fluid conduits 24) defined within the tubing annulus 25 of the pipe segment 20, which is internal to the outer barrier layer 28 of the pipe segment 20. Additionally or alternatively, a fault in the inner barrier layer 26 of a pipe segment 20 may reduce its ability to provide isolation between the conditions in the pipe bore 32 of the pipe segment 20 and the conditions in free space defined within the tubing annulus 25 of the pipe segment 20, which is external to the inner barrier layer 26 of the pipe segment 20.

Generally, when a fault is not present on its tubing 22, one or more parameters (e.g., characteristics and/or properties) of fluid flowing through a pipe segment 20 may nevertheless change as it flows therethrough. However, a fluid parameter change resulting from fluid flow through a pipe segment 20 with non-faulty pipe segment tubing 22 is generally predictable, for example, based at least in part on a model, empirical testing, environmental conditions external to the pipe segment 20, fluid parameters of fluid input (e.g., supplied) to the pipe segment 20, implementation parameters, such as material and/or thickness, of the pipe segment tubing 22, or any combination thereof. In other words, at least in some instances, an unexpected (e.g., unpredicted) change in a fluid parameter resulting from fluid flow through a pipe segment 20 may be indicative of its tubing 22 potentially having one or more faults, such as a dent, a kink, and/or a breach.

Leveraging this fact, to facilitate testing pipe integrity, in some embodiments, the testing system 38 may inject test fluid into free space (e.g., one or more fluid conduits 24) defined within the tubing annulus 25 (e.g., one or more intermediate layers 34) of the pipe segment 20, for example, via a test fluid source 42 fluidly connected to the test head assembly 44 via one or more external fluid conduits 60. In particular, in some embodiments, the test fluid may be an inert fluid, such as nitrogen (e.g., $N_2$) gas. Additionally, in some embodiments, one or more fluid parameters (e.g., temperature, pressure, and/or composition) of the test fluid may be pre-determined before supply to the tubing annulus 25 of a pipe segment 20, for example, offline by a test lab and/or a fluid supplier such that the pre-determined fluid parameters of the test fluid are stored in memory 52 of a control sub-system 40. In some embodiments, one or more fluid parameters of the test fluid may be additionally or alternatively determined (e.g., sensed and/or measured) while the test fluid is being supplied to the tubing annulus 25 of the pipe segment 20, for example, online and/or in real-time via one or more fluid parameter sensors 43 such that the input (e.g., initial) fluid parameters of the test fluid are stored in memory 52 of the control sub-system 40.

As described above, at least in some instances, a fault in the tubing 22 of a pipe segment 20 may result in one or more parameters of fluid flowing through the pipe segment 20 changing in a manner different than expected (e.g., predicted). To facilitate determining changes in fluid parameters resulting from fluid flow in the tubing annulus 25 of a pipe segment 20, in some embodiments, the testing system 38 may determine one or more downstream fluid parameters (e.g., temperature, pressure, and/or composition) via one or more fluid parameter sensors 43, for example, which are fluidly connected to the test head assembly 44 (e.g., via one or more external fluid conduits 60). In other words, in such embodiments, the testing system 38 may test the integrity of the pipe segment 20 at least in part by comparing one or more fluid parameters of fluid (e.g., test fluid) supplied to the tubbing annulus 25 of the pipe segment 20 and corresponding downstream fluid parameters resulting from fluid flow through the tubing annulus 25. Thus, at least in some instances, implementing and/or operating a testing system 38 in this manner may facilitate improving operational reliability of a pipeline system 10, for example, by enabling confirmation of pipe segment integrity and/or amelioration of a pipe segment fault before beginning and/or resuming normal operation of the pipeline system 10.

Figure 5:
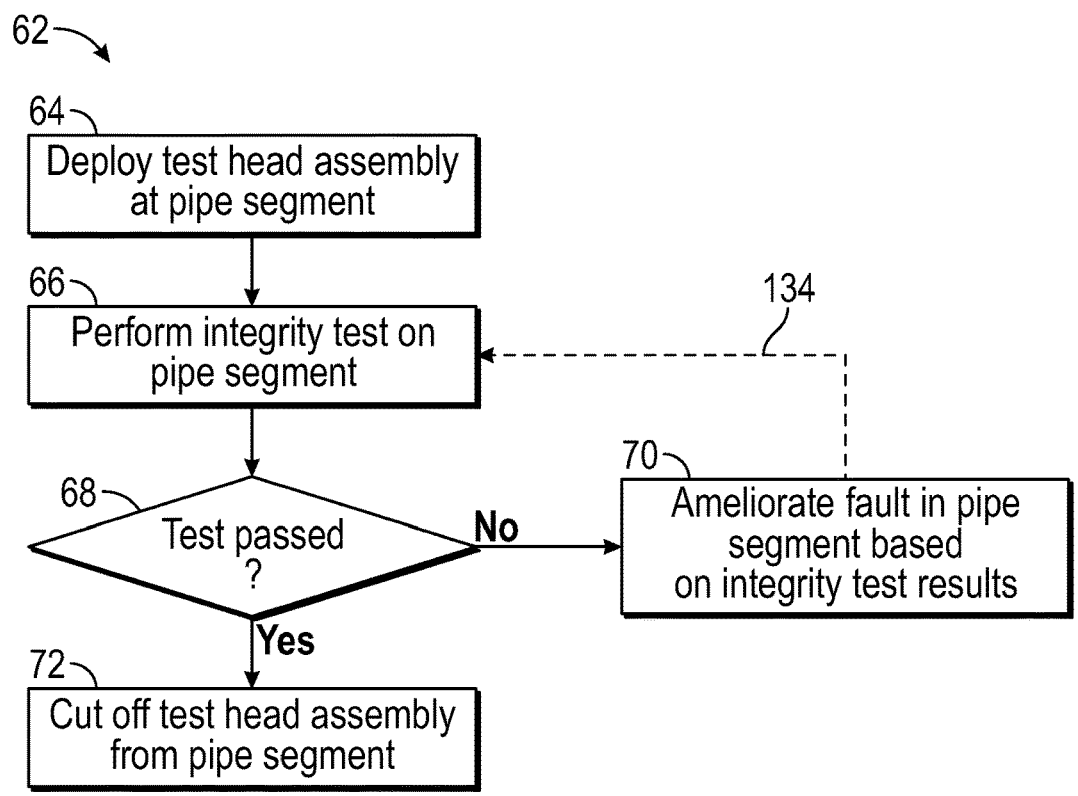
FIG. 5 is a flow diagram of an example of a process for operating the testing system of FIG. 4, in accordance with an embodiment of the present disclosure.

To help further illustrate, an example of a process 62 for operating a testing system 38 is described in FIG. 5. Generally the process 62 includes deploying a test head assembly at a pipe segment (process block 64) and performing an integrity test on the pipe segment (process block 66). Additionally, the process 62 generally includes determining whether the integrity test is passed (decision block 68), ameliorating a fault in the pipe segment based on results of the integrity test when the integrity test is not passed (process block 70), and cutting off the test head assembly from the pipe segment when the integrity test is passed (process block 72).

Although described in a specific order, which corresponds with an embodiment of the present disclosure, it should be appreciated that the example process 62 is merely intended to be illustrative and non-limiting. In particular, in other embodiments, a process 62 for operating a testing system 38 may include one or more additional process blocks and/or omit one or more of the depicted process blocks. Moreover, in some embodiments, the process 62 may be performed at least in part by executing instructions stored in one or more tangible, non-transitory, computer-readable media, such as memory 52 in a control sub-system 40, using processing circuitry, such as a processor 50 in the control sub-system 40.

For example, in some embodiments, a control sub-system 40 in a testing system 38 may control operation of deployment equipment 45 to facilitate deploying a test head assembly 44 at a pipe segment 20 (process block 64). However, in other embodiments, deployment equipment 45 may be manually operated by an operator (e.g., user and/or service technician) of a testing system 38 to deploy a test head assembly 44 at a pipe segment 20. In any case, as mentioned above, in some embodiments, the deployment equipment 45 may include a poly welding (e.g., heating) device, which is implemented and/or operated to poly weld barrier material to facilitate sealing free space defined within a tubing annulus 25 of a pipe segment 20 from environmental conditions external to the tubing 22 of the pipe segment 20.

Figure 6:
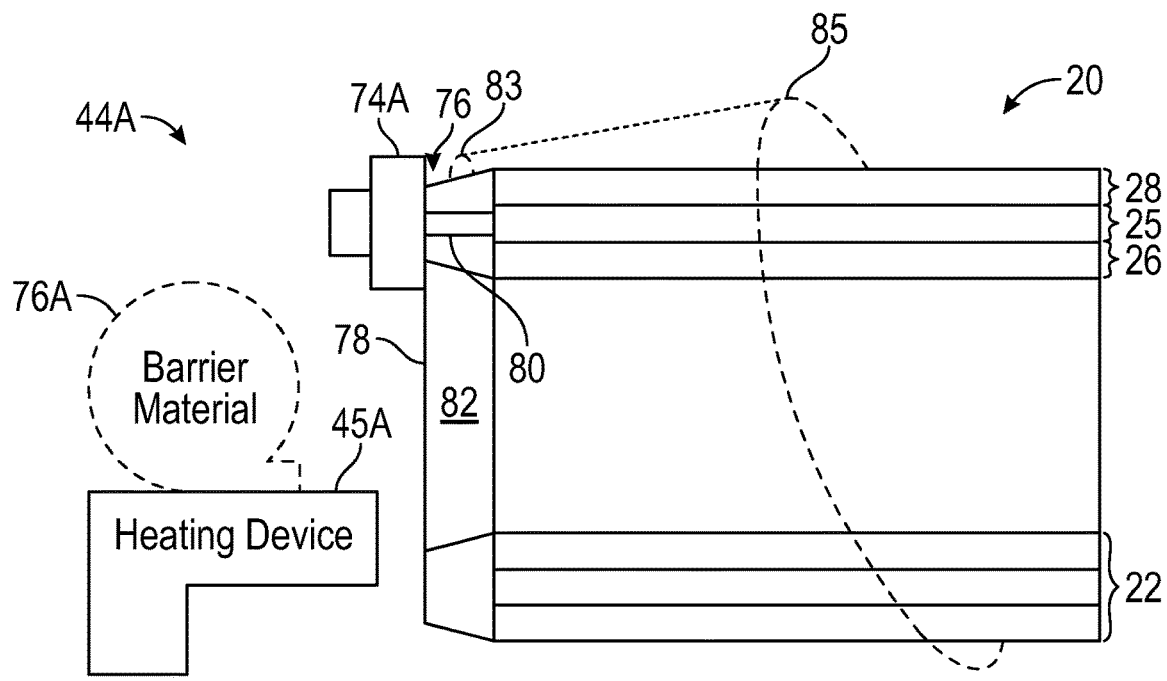
FIG. 6 is cross-sectional view of an example of the test head assembly of FIG. 4 secured to a pipe segment, in accordance with an embodiment of the present disclosure.

To help illustrate, an example of a test head assembly 44A secured to the tubing 22 of a pipe segment 20 is shown in FIG. 6. To facilitate testing integrity of a pipe segment 20, as in the depicted example, a test head assembly 44 in a testing system 38 may generally include one or more fluid ports 74, which are each implemented to be fluidly connected to free space (e.g., one or more fluid conduits 24) defined in the tubing annulus 25 of the pipe segment 20. Additionally, as in the depicted example, a test head assembly 44 in a testing system 38 may generally include barrier material 76, which is poly welded (e.g., fused) to the inner barrier layer 26 and/or the outer barrier layer 28 of a pipe segment 20 to facilitate sealing an open end of the tubing annulus 25 in the pipe segment 20 from environmental conditions external to the tubing 22 of the pipe segment 20.

As such, the barrier material 76 included in a test head assembly 44 may generally be plastic. In fact, in some embodiments, the barrier material 76 included in a test head assembly 44 may generally match the barrier material 76 of the inner barrier layer 26 and/or the outer barrier layer 28 of a pipe segment 20 to which the test head assembly 44 is to be secured. For example, the barrier material 76 included in the test head assembly 44 may be high-density polyethylene (HDPE) or another suitable type of plastic. Accordingly, as in the depicted example, deployment equipment 45 used to secure a test head assembly 44 to a pipe segment 20 may include a poly welding (e.g., heating) device 45A, which is implemented and/or operated to selectively melt barrier material 76.

Additionally, in some embodiments, poly welded barrier material 76 of a test head assembly 44 may be implemented at least in part by poly welding a discrete (e.g., supplemental) barrier material ring 78 circumferentially to the inner barrier layer 26 and/or the outer barrier layer 28 of a pipe segment 20 at an end of the pipe segment 20. However, in other embodiments, poly welded barrier material 76 of a test head assembly 44 may be implemented at least in part by melting supplemental (e.g., filler) barrier material 76A onto an end of a pipe segment 20, for example, from a spool of barrier material wire. Moreover, in some embodiments, poly welded barrier material 76 of a test head assembly 44 may be implemented using barrier material 76 of the inner barrier layer 26 and/or the outer barrier layer 28 of a pipe segment 20. However, to facilitate sealing the tubing annulus 25 of a pipe segment 20 using barrier material of one or more of its barrier layers, in some embodiments, the structure of the tubing 22 of the pipe segment 20 may be modified before a test head assembly 44 is secured thereto.

Figure 7:
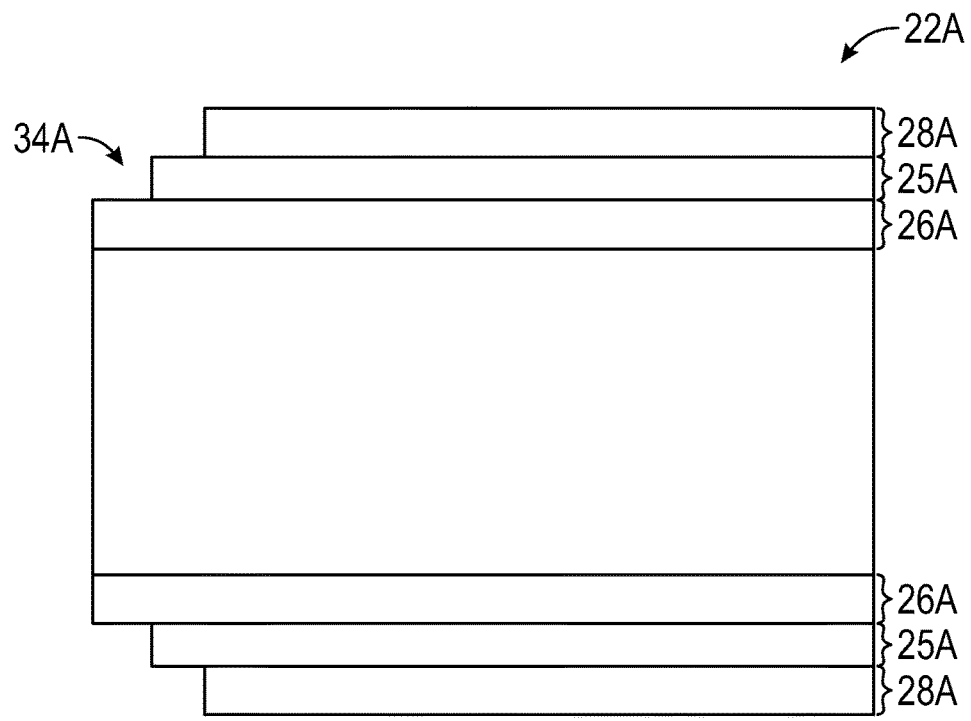
FIG. 7 is a cross-sectional view of an example of the pipe segment of FIG. 7 before a test head assembly is secured thereto, in accordance with an embodiment of the present disclosure.

To help illustrate, an example of a pipe segment tubing 22A that has had its structure modified is shown in FIG. 7. In particular, as depicted, each intermediate layer 34A in the annulus 25A of the pipe segment tubing 22A and the outer barrier layer 28A of the pipe segment tubing 22A are cutback relative to the inner barrier layer 26A of the pipe segment tubing 22A in a tiered (e.g., wedding cake) manner, for example, to facilitate increasing the amount of barrier material 76 available to poly weld the inner barrier layer 26A to the outer barrier layer 28A. In other words, as depicted, each intermediate layer 34A in the annulus 25A of the pipe segment tubing 22A is cutback relative to the inner barrier layer 26A a shorter (e.g., first) distance while the outer barrier layer 28A is cutback relative to the inner barrier layer 26A a longer (e.g., second) distance. Accordingly, in such embodiments, poly welded barrier material 76 of a test head assembly 44 may be implemented at least in part by bending (e.g., flaring) barrier material 76 of the inner barrier layer 26 of the pipe segment 20 out over the one or more intermediate layers 34 in the tubing annulus 25 of the pipe segment 20 and poly welding the barrier material 76 of the inner barrier layer 26 to the barrier material 76 of the outer barrier layer 28 of the pipe segment 20.

However, it should be appreciated that the depicted example is merely intended to be illustrative and not limiting. In particular, in other embodiments, the structure of pipe segment tubing 22 may be modified in a different manner before a test head assembly 44 is secured thereto. For example, in some such embodiments, the one or more intermediate layers 34 included in the tubing annulus 25 of a pipe segment 20 and the outer barrier layer 28 of the pipe segment 20 may be cutback relative to the inner barrier layer 26 of the pipe segment 20 the same distance. As another example, the one or more intermediate layers 34 included in the tubing annulus 25 of a pipe segment 20 and the inner barrier layer 26 of the pipe segment 20 may be cutback relative to the outer barrier layer 28 of the pipe segment 20, for example, to enable a portion of the outer barrier layer 86, which is exposed by the cutbacks, to be bent in out over the one or more intermediate layers 34 and poly welded to the inner barrier layer 26.

In any case, as in the example depicted in FIG. 6, to facilitate further securing poly welded barrier material 76 of a test head assembly 44 to a pipe segment 20, in some embodiments, the test head assembly 44 may additionally include a pad eye 83, which is implemented to enable one or more straps (e.g., chains) 85 to be secured to the poly welded barrier material 76. In particular, in some such embodiments, a pad eye 83 of a test head assembly 44 may be implemented using poly welded barrier material 76 of the test head assembly 44. However, in other embodiments, a pad eye 83 of a test head assembly 44 may be implemented as a separate component, which is then embedded or otherwise secured to poly welded barrier material 76 of the test head assembly. In any case, as in the depicted example, a strap 85, which is wrapped around the tubing 22 of a pipe segment 20, may be secured to a pad eye 83 on a test head assembly 44 and, thus, facilitate securing poly welded barrier material 76 of the test head assembly 44 to the pipe segment tubing 22, for example, even after a poly welded between the test head assembly 44 and the pipe segment tubing 22 is broken.

Moreover, as depicted, a fluid port 74A of the test head assembly 44A is fluidly connected to free space (e.g., one or more fluid conduits 24) defined within the tubing annulus 25 of the pipe segment 20 through the poly welded barrier material 76 of the test head assembly 44A. In particular, as in the depicted example, to facilitate fluidly connecting a fluid port 74 of a test head assembly 44 to the tubing annulus 25 of a pipe segment 20 through poly welded barrier material 76 of the test head assembly 44, in some embodiments, the test head assembly 44 may additionally include a fluid tube 80, which is embedded within the poly welded barrier material 76 and implemented to be aligned with free space defined within the tubing annulus 25 of the pipe segment 20. More specifically, in some such embodiments, the fluid tube 80 may be embedded within a discrete barrier material ring 78 in the test head assembly 44 before the barrier material ring 78 is poly welded to the tubing 22 of a pipe segment 20. However, in other embodiments, a poly welding device 45A may be operated to dispose melted barrier material 76 around the fluid tube 80 after the fluid tube 80 is fluidly connected to the tubing annulus 25 of a pipe segment 20. In any case, in this manner, a test head assembly 44 of a testing system 38 may be implemented and/or deployed at a pipe segment 20 to facilitate testing integrity of the pipe segment 20 at least in part by sealing the tubing annulus 25 of the pipe segment 20 from conditions external to the tubing 22 of the pipe segment 20 while enabling test fluid to flow into and/or out from the tubing annulus 25 of the pipe segment 20.

However, it should be appreciated that the depicted example is merely intended to be illustrative and not limiting. In particular, in other embodiments, the test head assembly 44A of FIG. 6 may not include a pad eye 83 and/or one or more straps (e.g., chains) 85. Additionally, as will be described in more detail below, in other embodiments, a fluid port 74 of a test head assembly 44 may be implemented separate from poly welded barrier material 76 of the test head assembly 44. Furthermore, in other embodiments, a bore portion 82 of a test head assembly 44 may instead be solid. In particular, in some such embodiments, the test head assembly 44 may additionally include a coned bore plug.

Figure 8:
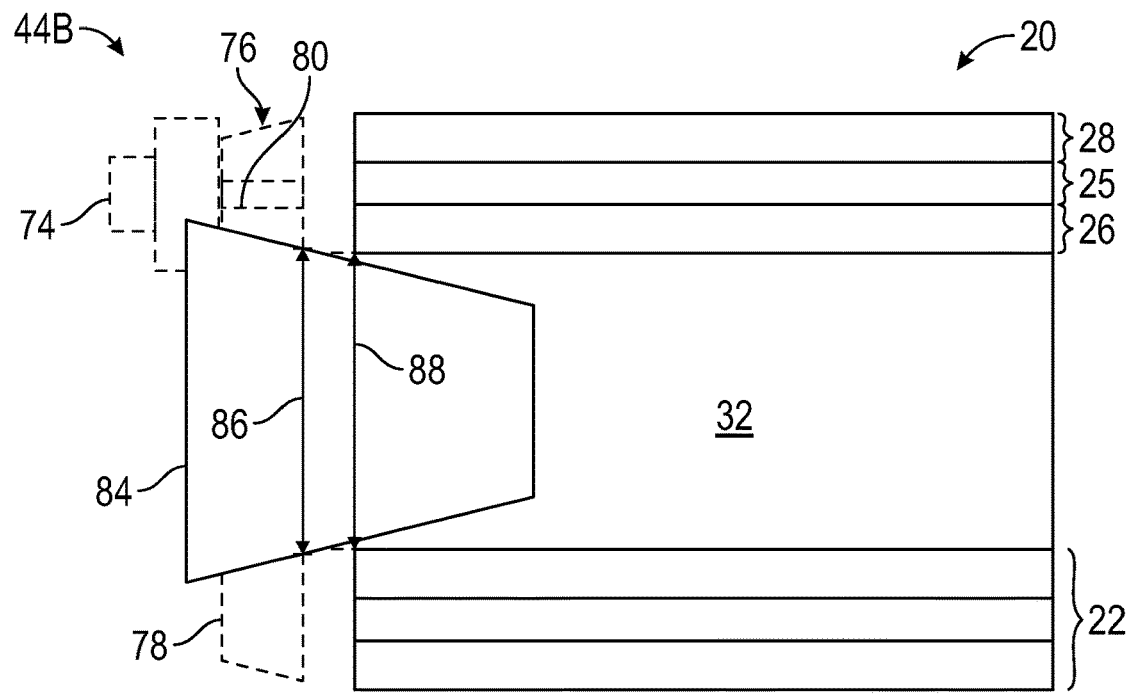
FIG. 8 is a cross-sectional view of another example of the test head assembly of FIG. 4 secured to a pipe segment, in accordance with an embodiment of the present disclosure.

To help illustrate, a pipe segment 20 and another example of a test head assembly 44B are shown in FIG. 8. As depicted, the test head assembly 44B includes a coned bore plug 84, which is implemented to be inserted into an open end of the pipe bore 32 defined by the tubing 22 of the pipe segment 20. Additionally, as in the depicted example, in some embodiments, a coned bore plug 84 of a test head assembly 44 may be integrated with a barrier material ring 78 of the test head assembly 44, for example, such that the barrier material ring 78 is implemented circumferentially around the coned bore plug 84.

In any case, as in the depicted example, in some embodiments, an ending outer surface diameter 86 of the coned bore plug 84 may be larger than an inner surface diameter 88 of the tubing 22 of the pipe segment 20, for example, due to ovalization of the pipe segment tubing 22. Accordingly, at least in such instances, inserting the coned bore plug 84 into the pipe bore 32 of the pipe segment 20 may facilitate circularizing (e.g., re-circularizing) the tubing 22 of the pipe segment 20 and, thus, properly aligning a barrier material ring 78 of the test head assembly 44 with the tubing 22 of the pipe segment 20. In other words, at least in some such instances, inserting the coned bore plug 84 into the pipe bore 32 may facilitate aligning a fluid tube 80 embedded in the barrier material ring 78 with free space (e.g., one or more fluid conduits 24) defined in the tubing annulus 25 of the pipe segment 20. Moreover, in some embodiments, a coned bore plug 84 with an integrated barrier material ring 78 may be implemented such that a seal is formed between the outer surface of the coned bore plug 84 and the inner surface of the tubing 22 of a pipe segment 20 when the coned bore plug 84 is inserted into the pipe bore 32 of the pipe segment 20, which, at least in some instances, may obviate poly welding the barrier material ring 78 to the inner barrier layer 26 of the pipe segment 20.

However, it should be appreciated that the depicted example is merely intended to be illustrative and not limiting. In particular, in some embodiments, the test head assembly 44B of FIG. 8 may additionally include a pad eye 83 and one or more straps (e.g., chains) 85. Additionally, in other embodiments, a coned bore plug 84 and a barrier material ring 78 of a test head assembly 46 may be implemented as distinct (e.g., discrete and/or separate) components and, thus, the coned bore plug 84 may be inserted into the pipe bore 32 of a pipe segment 20 before the barrier material ring 78 is poly welded to the tubing 22 of the pipe segment 20. Furthermore, as mentioned above, in other embodiments, a fluid port 74 of a test head assembly 44 may be implemented separate from poly welded barrier material 76 of the test head assembly 44.

Figure 9:
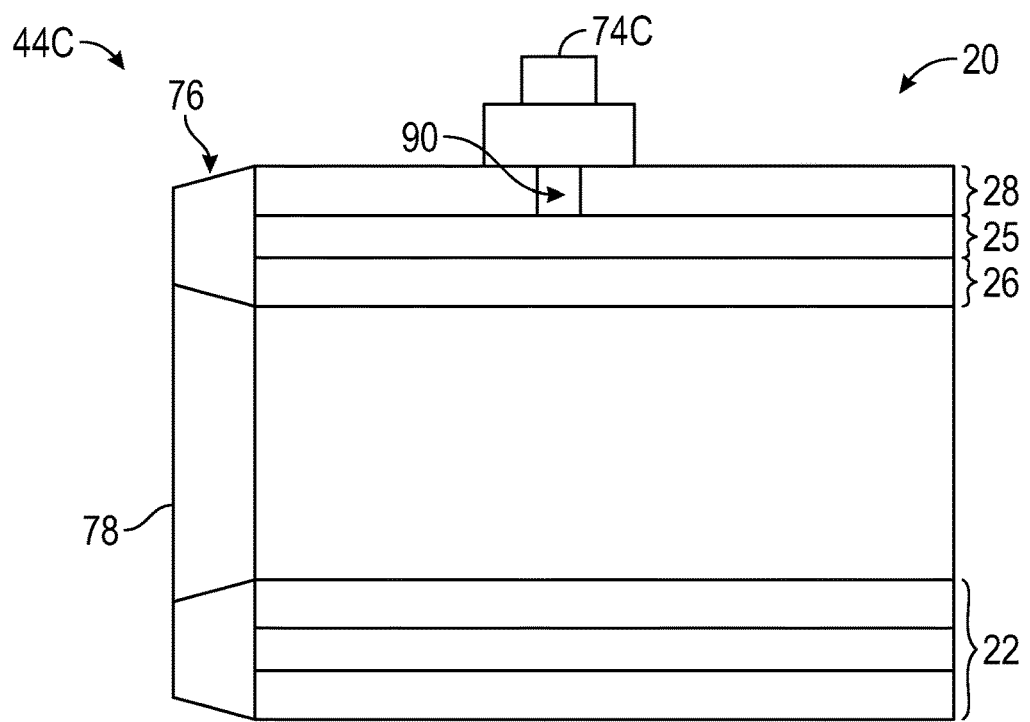
FIG. 9 is a cross-sectional view of a further example of the test head assembly of FIG. 4 secure to a pipe segment, in accordance with an embodiment of the present disclosure.

To help illustrate, a further example of a test head assembly 44C secured to the tubing 22 of a pipe segment 20 is shown in FIG. 9. Similar to FIG. 6, as depicted in FIG. 9, the test head assembly 44C includes barrier material 76, which is poly welded to the inner barrier layer 26 and the outer barrier layer 28 of the pipe segment 20 such that poly welded barrier material 76 covers (e.g., encloses) an open end of the tubing annulus 25 in the pipe segment 20 and, thus, facilitates sealing free space defined within the tubing annulus 25 from environmental conditions external to the tubing 22 of the pipe segment 20. Additionally, similar to FIG. 6, as depicted in FIG. 9, the test head assembly 44C includes a fluid port 74C, which is fluid connected to free space (e.g., one or more fluid conduits 24) defined within the tubing annulus 25 of the pipe segment 20.

However, as depicted in FIG. 9, the fluid port 74C of the test head assembly 44C is implemented separate from the poly welded barrier material 76 of the test head assembly 44C. In particular, as depicted, the fluid port 74C is fluidly connected to free space defined within the tubing annulus 25 of the pipe segment 20 via an opening (e.g., hole) 90 formed through the outer barrier layer 28 of the pipe segment 20. In other words, instead of being secured to an end of a pipe segment 20, the fluid port 74C of the test head assembly 44C may be secured along the length of the pipe segment 20, for example, via a clamp that wraps circumferentially around the tubing 22 of the pipe segment 20.

However, it should be appreciated that the depicted example is merely intended to be illustrative and not limiting. In particular, in some embodiments, the test head assembly 44C of FIG. 9 may additionally include a coned bore plug 84. Additionally or alternatively, the test head assembly 44C of FIG. 9 may additionally include a pad eye 83 and one or more straps (e.g., chains) 85. Furthermore, in other embodiments, a test head assembly 44 in a testing system 38 may include a fluid port 74A secured to an end of a pipe segment 20 as well as a fluid port 74C secured along the length of the pipe segment 20, for example, such that the fluid port 74C secured along the length of the pipe segment 20 is used to determine a downstream fluid parameter. In any case, in this manner, a test head assembly 44 in a testing system 38 may be implemented and/or deployed at a pipe segment 20 to facilitate testing integrity of the pipe segment 20 at least in part by sealing the tubing annulus 25 of the pipe segment 20 from conditions external to the tubing 22 of the pipe segment 20 while enabling test fluid to flow into and/or out from the tubing annulus 25 of the pipe segment 20.

Figure 10:
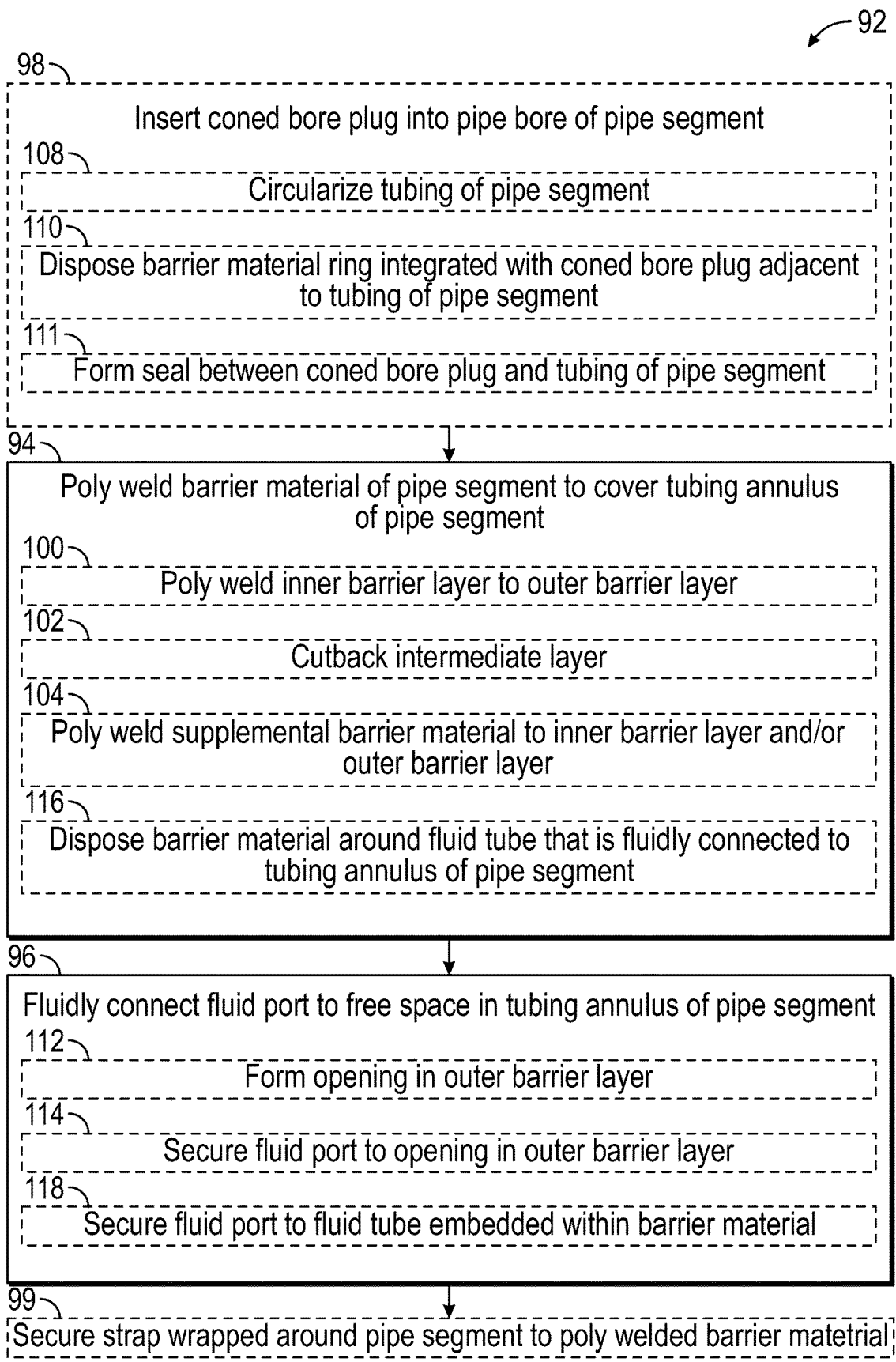
FIG. 10 is a flow diagram of an example of a process for deploying the test head assembly of FIG. 4 at a pipe segment, in accordance with an embodiment of the present disclosure.

To help further illustrate, an example of a process 92 for deploying a test head assembly 44 at a pipe segment 20 is described in FIG. 10. Generally, the process 92 includes poly welding barrier material of a pipe segment to cover a tubing annulus of the pipe segment (process block 94). Additionally, the process 92 generally includes fluidly connecting a fluid port to free space within the tubing annulus of the pipe segment (process block 96).

Although described in a specific order, which corresponds with an embodiment of the present disclosure, it should be appreciated that the example process 92 is merely intended to be illustrative and not limiting. In particular, in other embodiments, a process 92 for deploying a test head assembly 44 at a pipe segment 20 may include one or more additional process blocks and/or omit one or more of the depicted process blocks. For example, some embodiments of the process 92 may additionally include inserting a coned bore plug into a pipe bore of the pipe segment (process block 98) while other embodiments of the process 92 do not. As another example, some embodiments of the process 92 may additionally include securing a strap wrapped around the pipe segment to poly welded barrier material (process block 99) while other embodiments of the process 92 do not. Furthermore, in other embodiments, one or more of the depicted process blocks may be performed in a different order, for example, such that the fluid port is fluidly connected to free space within the tubing annulus of the pipe segment before barrier material of the pipe segment is poly welded to cover the tubing annulus of the pipe segment.

In any case, as described above, a test head assembly 44 in a testing system 38 may generally include barrier material 76 poly welded to a pipe segment 20 such that the poly welded barrier material 76 covers and, thus, seals the tubing annulus 25 of the pipe segment 20 from conditions external to the tubing 22 of the pipe segment 20. Accordingly, deploying a test head assembly 44 at a pipe segment 20 may include poly welding barrier material 76 of the pipe segment 20 to cover an end of the tubing annulus 25 of the pipe segment 20 (process block 94). In particular, as described above, in some embodiments, the poly welded barrier material 76 of a test head assembly 44 may include barrier material 76 from the inner barrier layer 26 and the outer barrier layer 28 of a pipe segment 20. In other words, in such embodiments, poly welding the barrier material 76 of the pipe segment 20 may include poly welding the inner barrier layer 26 of the pipe segment 20 to the outer barrier layer 28 of the pipe segment (process block 100).

To facilitate poly welding the inner barrier layer 26 of a pipe segment 20 to the outer barrier layer 28 of the pipe segment 20, as described above, in some embodiments, the structure of the tubing 22 of the pipe segment 20 may be modified before poly welding. In particular, as described above, in some such embodiments, the structure of the pipe segment tubing 22 may be modified at least in part by cutting back the one or more intermediate layers 34 included in the tubing annulus 25 of the pipe segment 20, for example, relative to the inner barrier layer 26 of the pipe segment 20 or relative to the outer barrier layer 28 of the pipe segment 20 to facilitate providing more barrier material for poly welding (process block 102). More specifically, as described above, in some such embodiments, the one or more intermediate layers 34 include in the tubing annulus 25 and the outer barrier layer 28 may each be cutback relative to the inner barrier layer 26, for example, to enable a portion of the inner barrier layer 26, which is exposed by the cutbacks, to be bent (e.g., flared) out over the one or more intermediate layers 34 and poly welded to the outer barrier layer 28. However, as described above, in other such embodiments, the one or more intermediate layers 34 included in the tubing annulus 25 and the inner barrier layer 26 may each be cutback relative to the outer barrier layer 28, for example, to enable a portion of the outer barrier layer 28, which is exposed by the cutbacks, to be bent in over the one or more intermediate layer 34 and poly welded to the inner barrier layer 26.

In any case, as described above, in addition to barrier material 76 of pipe segment tubing 22, in some embodiments, poly welded barrier material 76 of a test head assembly 44 may include supplemental (e.g., filler) barrier material 76A. In other words, in such embodiments, poly welding barrier material 76 of the pipe segment 20 may include poly welding supplemental barrier material 76A to the inner barrier layer 26 of the pipe segment 20, the outer barrier layer 28 of the pipe segment 20, or both (process block 104). In particular, as described above, in some such embodiments, the supplemental barrier material 76A may include a barrier material ring 78, which is implemented to be aligned with and poly welded to the tubing 22 of a pipe segment 20. Additionally or alternatively, as described above, in some such embodiments, the supplemental barrier material 76A may be melted by a poly welding device 45A onto the tubing 22 of a pipe segment 20, for example, from a spool of barrier material wire.

Furthermore, as described above, in some embodiments, a test head assembly 44 in a testing system 38 may additionally include a coned bore plug 84, which is implemented to be inserted into an end of the pipe bore 32 of a pipe segment 20. In other words, in such embodiments, deploying a test head assembly 44 at a pipe segment 20 may include inserting a coned bore plug 84 of the test head assembly 44 into the pipe bore 32 of the pipe segment 20 (process block 98). In particular, as described above, in some instances, the ending outer surface diameter 86 of the coned bore plug 84 may be larger than the inner surface diameter 88 of the tubing 22 of the pipe segment 20, for example, due to ovalization of the pipe segment tubing 22. Thus, at least in such instances, inserting the coned bore plug 84 into the pipe bore 32 of the pipe segment 20 may include circularizing the tubing 22 of the pipe segment 20, for example, to facilitate properly aligning a barrier material ring 78 with the pipe segment tubing 22 (process block 108).

In fact, as described above, in some embodiments, a coned bore plug 84 of a test head assembly 44 may be integrated with a barrier material ring 78 of the test head assembly 44, for example, such that the barrier material ring 78 is implemented circumferentially around the coned bore plug 84. Thus, in such embodiments, inserting the coned bore plug 84 into the pipe bore 32 of the pipe segment 20 may include disposing a barrier material ring 78 integrated with the coned bore plug 84 adjacent to the tubing 22 of the pipe segment 20 (process block 110). However, as described above, in other embodiments, a coned bore plug 84 and a barrier material ring 78 of a test head assembly 44 may be implemented as separate (e.g., distinct) components and, thus, the coned bore plug 84 may be inserted into the pipe bore 32 of a pipe segment 20 before the barrier material ring 78 is disposed adjacent to the tubing 22 of the pipe segment 20.

Moreover, as described above, in some embodiments, a coned bore plug 84 of a test head assembly 44 may be implemented such that a seal is formed between the outer surface of the coned bore plug 84 and the inner surface of the tubing 22 of a pipe segment 20 when the coned bore plug 84 is inserted into the pipe bore 32 of the pipe segment 20. In other words, in such embodiments, inserting the coned bore plug 84 into the pipe bore 32 of the pipe segment 20 may include forming a seal between the outer surface of the coned bore plug 84 and the inner surface of the tubing 22 of the pipe segment 20 (process block 111). In fact, as described above, when a barrier material ring 78 is integrated with the coned bore plug 84, at least in some instances, the seal formed between the outer surface of the boned bore plug 84 and the inner surface of the pipe segment tubing 22 may obviate poly welding the barrier material ring 78 to the inner barrier layer 26 of the pipe segment 20.

In any case, as described above, to facilitate testing pipe integrity, a test head assembly 44 in a testing system 38 may generally include one or more fluid ports 74, which are implemented to be fluidly connected to free space (e.g., one or more fluid conduits 24) defined within the tubing annulus 25 of a pipe segment 20. Accordingly, deploying a test head assembly 44 at a pipe segment 20 may include fluidly connecting one or more fluid ports 74 to free space defined in the tubing annulus 25 of the pipe segment 20 (process block 96). In particular, as described above, in some embodiments, a fluid port 74 of a test head assembly 44 may be fluidly connected to the free space in the tubing annulus 25 of a pipe segment 20 via an opening (e.g., hole) 90 formed through the outer barrier layer 28 of the pipe segment 20. In other words, in such embodiments, fluidly connecting the fluid port 74 to the free space within the tubing annulus 25 may include forming an opening 90 that extends through the outer barrier layer 28 of the pipe segment 20 to the tubing annulus 25 (process block 112) and securing the fluid port 74 to the opening 90 in the outer barrier layer 28, for example, via a clamp that wraps circumferentially around the tubing 22 of the pipe segment 20 (process block 114).

Additionally or alternatively, as described above, in some embodiments, a fluid port 74 of a test head assembly 44 may be fluid connected to free space defined within the tubing annulus 25 of a pipe segment 20 through poly welded barrier material 76 of the test head assembly 44. In particular, as described above, in some such embodiments, the fluid port 74 may be fluidly connected to free space in the tubing annulus 25 via a fluid tube 80 embedded within the poly welded barrier material 76 of the test head assembly 44. Thus, as described above, in such embodiments, poly welding barrier material 76 of the pipe segment 20 may include disposing barrier material 76 around a fluid tube 80 that is implemented to be fluidly connected to the tubing annulus 25 of the pipe segment 20 (process block 116) and fluidly connecting the fluid port 74 to the tubing annulus 25 may include securing the fluid port 74 to the fluid tube 80 that is embedded within the barrier material 76 (process block 118).

Moreover, as described above, to facilitate further securing its poly welded barrier material 76 to the tubing 22 of a pipe segment 20, in some embodiments, a test head assembly 44 may additionally include one or more straps (e.g., chains) 85, which are implemented to be wrapped around the pipe segment tubing 22 and secured to the poly welded barrier material 76 of the test head assembly 44. In other words, in such embodiments, deploying a test head assembly 44 at a pipe segment 20 may include securing one or more straps 85, which are wrapped around the tubing 22 of the pipe segment 20, to poly welded barrier material 76 of the test head assembly 44 (process block 99). To facilitate securing a strap 85 to its poly welded barrier material 76, as described above, the test head assembly 44 may additionally include a pad eye 83.

In particular, as described above, in some embodiments, a pad eye 83 of a test head assembly 44 may be formed using poly welded barrier material 76 of the test head assembly 44. In other words, in such embodiments, poly welding barrier material 76 of a pipe segment 20 may include forming a pad eye 83 using the poly welded barrier material 76 (process block 117). However, as described above, in other embodiments, a pad eye 83 of a test head assembly 44 may be implemented as a discrete (e.g., separate) component and, thus, embedded or otherwise secured to poly welded barrier material 76 of the test head assembly 44. In other words, in some such embodiments, poly welding barrier material 76 of a pipe segment 20 may include embedding a (e.g., discrete) pad eye 83 within the poly welded barrier material 76 (process block 119). In any case, in this manner, a test head assembly 44 in a testing system 38 may be deployed at a pipe segment 20 to facilitate testing the integrity of the pipe segment 20 at least in part by sealing the tubing annulus 25 of the pipe segment 20 from conditions external to the tubing 22 of the pipe segment 20 while enabling test fluid to flow into and/or out from the tubing annulus 25 of the pipe segment 20.

Figure 11:
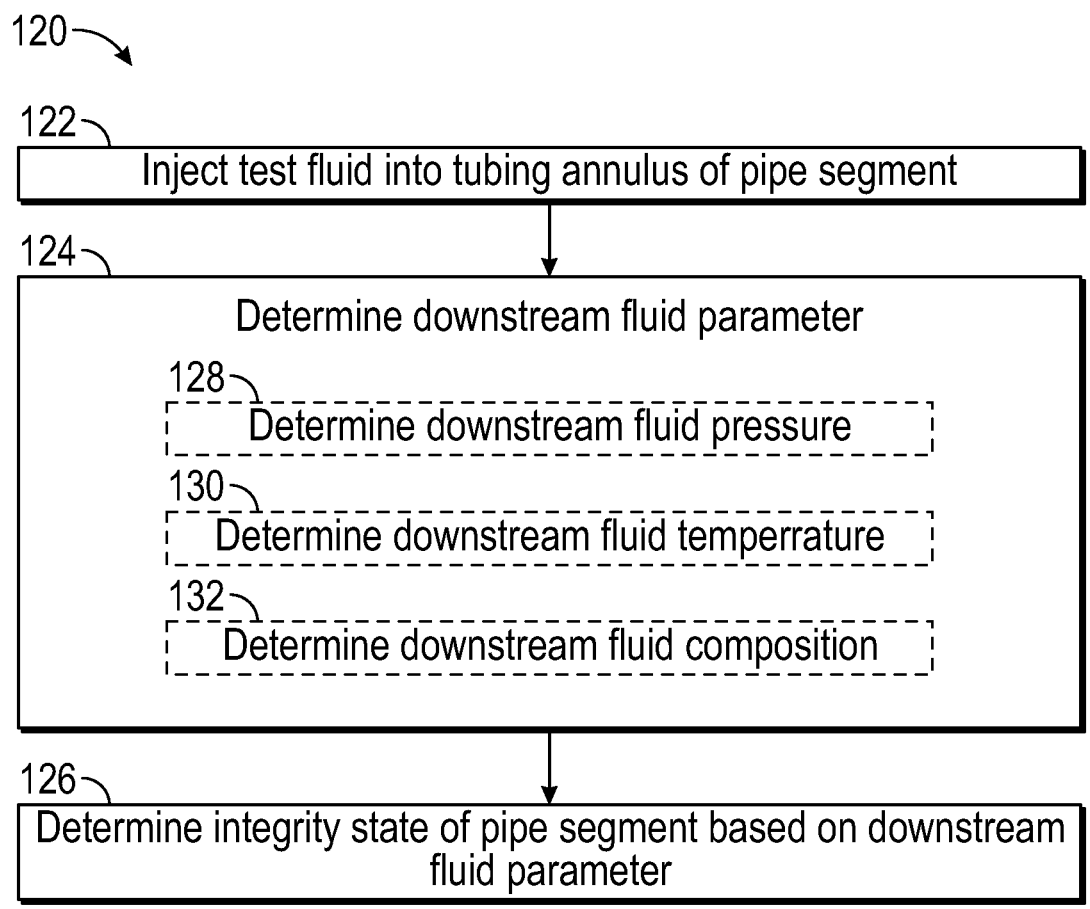
FIG. 11 is a flow diagram of an example of a process for testing integrity of a pipe segment using the testing system of FIG. 4, in accordance with an embodiment of the present disclosure.

In any case, returning to the process 62 of FIG. 5, the testing system 38 may then perform an integrity test on the pipe segment 20 at which the test head assembly 44 is deployed (process block 66). To help illustrate, an example of a process 120 for performing an integrity test on a pipe segment 20 is described in FIG. 11. Generally, the process 120 includes injecting test fluid into a tubing annulus of a pipe segment (process block 122), determining a downstream fluid parameter (process block 124), and determining an integrity state of the pipe segment based on the downstream fluid parameter (process block 126).

Although described in a specific order, which corresponds with an embodiment of the present disclosure, it should be appreciated that the example process 120 is merely intended to be illustrative and non-limiting. In particular, in other embodiments, a process 120 for performing an integrity test on a pipe segment 20 may include one or more additional process blocks and/or omit one or more of the depicted process blocks. Moreover, in some embodiments, the process 120 may be performed at least in part by executing instructions stored in one or more tangible, non-transitory, computer-readable media, such as memory 52 in a control sub-system 40, using processing circuitry, such as a processor 50 in the control sub-system 40.

For example, in some such embodiments, a control sub-system 40 in a testing system 38 may instruct the testing system 38 to inject test fluid (e.g., gas and/or liquid) into free space (e.g., one or more fluid conduits 24) defined within the tubing annulus 25 of a pipe segment 20 at which a test head assembly 44 of the testing system 38 is deployed (process block 122). As described above, a fluid port 74 of a test head assembly 44 may be implemented to be fluidly connected to the free space defined in the tubing annulus 25. Thus, to inject test fluid into the tubing annulus 25, in such embodiments, the control sub-system 40 may selectively instruct a test fluid source 42 to supply (e.g., pump and/or flow) the test fluid to the fluid port 74 of the test head assembly 44, for example, via one or more control signals 58. Nevertheless, in some embodiments, an operator (e.g., user and/or service technician) of the testing system 38 may additionally or alternatively manually control injection of the test fluid, for example, by selectively turning on a test fluid pump and/or adjusting valve position of a value fluidly coupled to the fluid port 74.

Moreover, as described above, in some embodiments, the test fluid may be an inert fluid, such as nitrogen (e.g., $N_2$) gas, for example, to facilitate reducing the likelihood that the test fluid itself affects (e.g., reduces) integrity of pipe segment tubing 22. In any case, as will be described in more detail below, in some embodiments, the integrity state of a pipe segment 20 may be determined based at least in part on one or more fluid parameters, such as temperature, pressure, and/or composition, of the test fluid. In some such embodiments, one or more fluid parameters of the test fluid may be pre-determined, for example, offline by a test lab and/or a fluid supplier and stored in memory 52 of the testing system 38. Additionally or alternatively, one or more fluid parameters of the test fluid may be determined while the test fluid is being supplied to the free space defined within the tubing annulus 25 of a pipe segment 20, for example, online and/or in real-time via one or more fluid parameter sensors 43.

Furthermore, the testing system 38 may determine one or more downstream fluid parameters that result from injection of the test fluid into the tubing annulus 25 of the pipe segment 20 (process block 124). As described above, in some embodiments, the one or more downstream fluid parameters may include a downstream fluid pressure determined (e.g., measured and/or sensed) by a pressure sensor 43, a downstream fluid temperature determined by a temperature sensor 43, and/or a downstream fluid composition determined by a fluid composition sensor 43. Thus, in such embodiments, determining the one or more downstream fluid parameters may include determining a downstream fluid pressure (process block 128), determining a downstream fluid temperature (process block 130), determining a downstream fluid composition (process block 132), or any combination thereof, for example, based at least in part on corresponding sensor signals 56 received from one or more fluid parameter sensors 43.

The testing system 38 may then determine an integrity state of the pipe segment 20 based at least in part on the one or more downstream fluid parameters (process block 126). As described above, the tubing 22 of a pipe segment 20 is generally implemented to facilitate isolating (e.g., insulating) conditions internal to the pipe segment 20 from environmental conditions external to the pipe segment 20. Generally, when a fault is not present in its tubing 22, one or more parameters (e.g., characteristics and/or properties) of fluid flowing through a pipe segment 20 may nevertheless change as it flows therethrough. However, a fluid parameter change resulting from fluid flow through a pipe segment 20 with non-faulty tubing 22 is generally predictable, for example, based at least in part on a model, empirical testing, environmental conditions external to the pipe segment 20, fluid parameters of fluid input (e.g., supplied) to the pipe segment 20, implementation parameters, such as material and/or thickness, of the pipe segment tubing 22, or any combination thereof.

In other words, at least in some instances, an actual fluid parameter change that differs (e.g., deviates) from a corresponding expected (e.g., predicted) fluid parameter change may be indicative of a fault being present in the tubing 22 of a pipe segment 20 that produced the actual fluid parameter change. For example, an actual fluid pressure change (e.g., drop) that differs from an expected fluid pressure change may be indicative of fluid leaking from the tubing annulus 25 of the pipe segment 20 and, thus, that the tubing 22 of the pipe segment 20 is potentially faulty. Additionally, an actual fluid temperature change (e.g., increase or decrease) that differs from an expected fluid temperature change may be indicative of increased heat transfer between the tubing annulus 25 of the pipe segment 20 and conditions external to the tubing 22 of the pipe segment 20 and, thus, that the pipe segment tubing 22 is potentially faulty and/or that the external (e.g., environmental and/or bore) conditions will potentially shorten the lifespan of the pipe segment tubing 22. Furthermore, an actual fluid composition change that differs from an expected fluid composition change may be indicative of conditions external to the tubing 22 of the pipe segment 20 contaminating the conditions in the tubing annulus 25 of the pipe segment 20 and, thus, that the pipe segment tubing 22 is potentially faulty.

To determine an actual fluid parameter change, the testing system 38 may compare a downstream fluid parameter with a corresponding fluid parameter of the test fluid. For example, the testing system 38 may determine an actual fluid pressure change at least in part by comparing the downstream fluid pressure with the fluid pressure of the test fluid. Additionally, the testing system 38 may determine an actual fluid temperature change at least in part by comparing the downstream fluid temperature with the fluid temperature of the test fluid. Furthermore, the testing system 38 may determine an actual fluid temperature change at least in part by comparing the downstream fluid temperature with the fluid temperature of the test fluid.

In some embodiments, the testing system 38 may identify that the integrity state of the pipe segment 20 is a non-faulty state when each of the actual fluid parameter changes does not differ from a corresponding expected fluid parameter change, for example, by more than an error threshold that facilitates accounting for sensor (e.g., measurement) error. On the other hand, the testing system 38 may identify that the integrity state of the pipe segment tubing 22 is a faulty state when one or more of the actual fluid parameter changes differs from a corresponding expected (e.g., predicted) fluid parameter change, for example, by more than a corresponding error threshold. Moreover, when the integrity state is a faulty state, in some embodiments, the testing system 38 may identify an expected type and/or an expected location of one or more faults in the tubing 22 of the pipe segment 20, for example, based at least in part on where the downstream fluid parameters are sensed and/or how an actual fluid parameter change deviates from a corresponding expected fluid parameter change. In this manner, a testing system 38 may be operated to perform a cycle of an integrity test on a pipe segment 20.

Returning to the process 62 of FIG. 5, the testing system 38 may then determine whether the pipe segment 20 being tested has passed the integrity test (decision block 68). In particular, the testing system 38 may determine that the pipe segment 20 has passed when the integrity test determines that the integrity state of its tubing 22 is a non-faulty state. On the other hand, the testing system 38 may determine that the pipe segment 20 has not passed when the integrity test determines that the integrity state of its tubing 22 is a faulty state.

To facilitate improving operational efficiency and/or operational reliability of a pipeline system 10 in which the pipe segment 20 is or is to be deployed, when the pipe segment 20 has not passed the integrity test, one or more faults in its tubing 22 may be ameliorated (e.g., fixed and/or repaired), for example, by a user (e.g., operator and/or service technician) of the testing system 38 based at least in part on results of the integrity test before the pipe segment 20 is used in normal operation of the pipeline system 10 (process block 70). To facilitate communicating results of the integrity test to a user, in some embodiments, the testing system 38 may instruct an I/O device 54, such as an electronic display, to display a graphical user interface (GUI) that provides a visual representation of the integrity test results. For example, the graphical user interface may include a visual representation of the integrity state of the pipe segment 20, an expected type of fault present in the tubing 22 of the pipe segment 20, and/or an expected location of a fault in the tubing 22 of the pipe segment 20. In fact, in some embodiments, another cycle of the integrity test may be performed on the pipe segment 20 once a fault in its tubing 22 is believed to have been ameliorated (arrow 134)

On the other hand, when the pipe segment 20 has passed the integrity test, the test head assembly 44 may be cut off from the pipe segment 20 (process block 72). A pipe fitting 18 may then be connected to the pipe segment 20 to enable the pipe segment 20 to be used in normal operation of the pipeline system 10. In this manner, the present disclosure provides techniques for implementing and/or deploying a test head assembly to facilitate testing integrity of one or more pipe segments deployed or to be deployed in a pipeline system, which, at least in some instances, may facilitate improving operational efficiency and/or operational reliability of the pipeline system, for example, at least in part by enabling a fault in the pipeline system to be ameliorated (e.g., fixed and/or repaired) before the pipeline system begins and/or resumes normal operation.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A system comprising:
   a pipe segment, wherein the pipe segment comprises tubing that defines a pipe bore through the pipe segment and a fluid conduit in a tubing annulus of the pipe segment, wherein each intermediate layer in the tubing annulus and an outer barrier layer of the pipe segment are cut back relative to an inner barrier layer of the pipe segment; and
   a test head assembly secured to the pipe segment, wherein the test head assembly comprises:
      barrier material poly welded to the tubing of the pipe segment to facilitate sealing the fluid conduit defined in the tubing annulus of the pipe segment from environmental conditions external to the tubing of the pipe segment, wherein the barrier material is implemented at least in part by:
         bending an exposed portion of the inner barrier layer of the pipe segment over each intermediate layer included in the tubing annulus of the pipe segment toward the outer barrier layer of the pipe segment; and
         poly welding the inner barrier layer of the pipe segment to the outer barrier layer of the tubing of the pipe segment; and
      a fluid port fluidly connected to the fluid conduit defined within the tubing annulus of the pipe segment to enable integrity of the tubing to be tested at least in part by flowing a test fluid into the fluid conduit defined in the tubing annulus of the pipe segment via the fluid port, extracting fluid from the fluid conduit defined in the tubing annulus of the pipe segment via the fluid port, or both.

2. The system of claim 1, wherein:
   the test head assembly comprises a fluid tube embedded within the barrier material of the test head assembly such that the fluid tube extends through the barrier material and is fluidly connected to the fluid conduit defined in the tubing annulus of the pipe segment; and
   the fluid port of the test head assembly is secured to the fluid tube embedded within the barrier material of the test head assembly.

3. The system of claim 1, wherein:
   an opening is formed through an outer barrier layer of the tubing of the pipe segment such that the opening is fluidly connected to the fluid conduit defined in the tubing annulus of the pipe segment; and
   the fluid port of the test head assembly is secured to the opening formed through the outer barrier layer of the tubing of the pipe segment.

4. The system of claim 1, wherein the barrier material of the test head assembly is implemented at least in part by melting supplemental barrier material onto the tubing of the pipe segment.

5. A method of deploying a test head assembly at a pipe segment to facilitate determining integrity of the pipe segment, comprising:
   poly welding barrier material of an inner barrier layer of the pipe segment, an outer barrier layer of the pipe segment, or both to facilitate sealing an open end of free space defined within a tubing annulus of the pipe segment from environmental conditions external to tubing of the pipe segment at least in part by:
      cutting back each intermediate layer included in the tubing annulus of the pipe segment and the outer barrier layer of the pipe segment relative to the inner barrier layer of the pipe segment;
      bending an exposed portion of the inner barrier layer out over each intermediate layer included in the tubing annulus toward the outer barrier layer of the pipe segment; and
      poly welding the inner barrier layer of the pipe segment to the outer barrier layer of the pipe segment; and
   fluidly connecting a fluid port to the free space defined within the tubing annulus of the pipe segment to enable integrity of the pipe segment to be tested at least in part by flowing a test fluid into the free space defined in the tubing annulus of the pipe segment via the fluid port, extracting fluid from the free space defined in the tubing annulus of the pipe segment via the fluid port, or both.

6. The method of claim 5, wherein poly welding the barrier material of the inner barrier layer of the pipe segment, the outer barrier layer of the pipe segment, or both comprises poly welding supplemental barrier material to the inner barrier layer of the pipe segment, the outer barrier layer of the pipe segment, or both.

7. The method of claim 6, wherein the supplemental barrier material comprises a barrier material ring.

8. The method of claim 5, comprising inserting a coned bore plug into a pipe bore of the pipe segment before poly welding barrier material of the inner barrier layer, the outer barrier layer, or both to facilitate circularizing tubing of the pipe segment.

9. The method of claim 5, wherein fluidly connecting the fluid port to the free space defined within the tubing annulus of the pipe segment comprises securing the fluid port to a fluid tube that is embedded within poly welded barrier material of the test head assembly.

10. The method of claim 5, wherein fluidly connecting the fluid port to the free space defined within the tubing annulus of the pipe segment comprises:
forming a hole through the outer barrier layer of the pipe segment such that the hole is fluidly connected to the free space defined within the tubing annulus of the pipe segment; and
securing the fluid port to the hole via a clamp that wraps circumferentially around the outer barrier layer of the pipe segment.

11. A system comprising:
a pipe segment, wherein the pipe segment comprises tubing that defines a pipe bore through the pipe segment and a fluid conduit in a tubing annulus of the pipe segment; and
a test head assembly secured to the pipe segment, wherein the test head assembly comprises:
barrier material poly welded to the tubing of the pipe segment to facilitate sealing the fluid conduit defined in the tubing annulus of the pipe segment from environmental conditions external to the tubing of the pipe segment, wherein the barrier material comprises a barrier material ring poly welded to an outer barrier layer of the tubing of the pipe segment;
a fluid port fluidly connected to the fluid conduit defined within the tubing annulus of the pipe segment to enable integrity of the tubing to be tested at least in part by flowing a test fluid into the fluid conduit defined in the tubing annulus of the pipe segment via the fluid port, extracting fluid from the fluid conduit defined in the tubing annulus of the pipe segment via the fluid port, or both; and
a coned bore plug inserted into an open end of the pipe bore of the pipe segment to facilitate circularizing the tubing of the pipe segment and aligning the barrier material ring with the tubing of the pipe segment, wherein:
the coned bore plug is integrated with the barrier material ring such that the barrier material ring is implemented circumferentially around the coned bore plug; and
a seal is formed between an outer surface of the coned bore plug and an inner surface of the tubing of the pipe segment when the coned bore plug is inserted into the pipe bore of the pipe segment to obviate polywelding the barrier material ring to an inner barrier layer of the tubing of the pipe segment.

* * * * *